US012190752B2

(12) United States Patent
Raynaud

(10) Patent No.: US 12,190,752 B2
(45) Date of Patent: Jan. 7, 2025

(54) SYSTEM AND METHOD FOR DUAL MODE PRESENTATION OF CONTENT IN A TARGET LANGUAGE TO IMPROVE LISTENING FLUENCY IN THE TARGET LANGUAGE

(71) Applicant: Jiveworld, SPC, Mill Valley, CA (US)

(72) Inventor: Daniel Paul Raynaud, Austin, TX (US)

(73) Assignee: JIVEWORLD, SPC, Mill Valley, CA (US)

( * ) Notice: Subject to any disclaimer, the term of this patent is extended or adjusted under 35 U.S.C. 154(b) by 0 days.

(21) Appl. No.: 17/962,062

(22) Filed: Oct. 7, 2022

(65) Prior Publication Data

US 2023/0048738 A1 Feb. 16, 2023

Related U.S. Application Data

(63) Continuation of application No. 17/132,988, filed on Dec. 23, 2020, now Pat. No. 11,551,568, which is a
(Continued)

(51) Int. Cl.
*G09B 5/06* (2006.01)
*G09B 19/06* (2006.01)
(Continued)

(52) U.S. Cl.
CPC ............... *G09B 5/06* (2013.01); *G09B 19/06* (2013.01); *G10L 21/10* (2013.01); *G09B 19/04* (2013.01); *G10L 15/08* (2013.01); *G10L 2015/088* (2013.01); *G10L 15/26* (2013.01); *H04N 21/4394* (2013.01); *H04N 21/4542* (2013.01)

(58) Field of Classification Search
CPC .......... G09B 5/06; G09B 19/06; G09B 19/04; G10L 21/10; G10L 15/08; G10L 15/26; G10L 2015/088; H04N 21/4394; H04N 21/4542
See application file for complete search history.

(56) References Cited

U.S. PATENT DOCUMENTS

| | | | | |
|---|---|---|---|---|
| 5,336,093 A * | 8/1994 | Cox | G09B 17/00 | 434/178 |
| 8,504,369 B1 * | 8/2013 | Chigier | G06F 40/103 | 704/271 |

(Continued)

OTHER PUBLICATIONS

European Search Report issued for European Patent Application No. 20787196.3, mailed Nov. 11, 2022, 9 pages.

(Continued)

*Primary Examiner* — Jack Yip
(74) *Attorney, Agent, or Firm* — SPRINKLE IP LAW GROUP

(57) ABSTRACT

Embodiments of a language learning system and method for implementing or assisting in self-study for improving listening fluency in a target language are disclosed. Such embodiments may simultaneously present the same piece of content in an auditory presentation and a corresponding visual presentation of a transcript of the auditory presentation, where the two presentations are adapted to work in tandem to increase the effectiveness of language learning for users.

21 Claims, 21 Drawing Sheets

Related U.S. Application Data continuation of application No. 16/844,252, filed on Apr. 9, 2020, now Pat. No. 10,984,667.

(60) Provisional application No. 62/831,380, filed on Apr. 9, 2019.

(51) Int. Cl.

| | |
|---|---|
| ***G10L 21/10*** | (2013.01) |
| *G09B 19/04* | (2006.01) |
| *G10L 15/08* | (2006.01) |
| *G10L 15/26* | (2006.01) |
| *H04N 21/439* | (2011.01) |
| *H04N 21/454* | (2011.01) |

(56) References Cited

U.S. PATENT DOCUMENTS

| | | | | | |
|---|---|---|---|---|---|
| 11,551,568 | B2 | 1/2023 | Raynaud | | |
| 2014/0297266 | A1* | 10/2014 | Nielson | A61B 5/165 | 704/9 |
| 2015/0331657 | A1* | 11/2015 | Bancroft | G10G 1/02 | 715/727 |
| 2016/0055145 | A1* | 2/2016 | Chauhan | G06Q 10/10 | 704/9 |
| 2021/0005109 | A1* | 1/2021 | Zhang | G09B 19/08 | |
| 2023/0048738 | A1 | 2/2023 | Raynaud | | |
| 2023/0419847 | A1 | 12/2023 | Raynaud | | |

OTHER PUBLICATIONS

Beth Skwarecki, "Improving Your Understanding of Spanish with Lupa," Nov. 7, 2019, 4 pages.

International Search Report and Written Opinion issued by the U.S. Patent and Trademark Office as the International Searching Authority (USPTO/ISA) for PCT Application No. PCT/US2023/73715, mailed Dec. 12, 2023, 8 pages.

* cited by examiner

*TRANSLATION: WHEN I WENT TO KYOTO

SYSTEM AND METHOD FOR DUAL MODE PRESENTATION OF CONTENT IN A TARGET LANGUAGE TO IMPROVE LISTENING FLUENCY IN THE TARGET LANGUAGE

RELATED APPLICATIONS

This application is a continuation of, and claims a benefit of priority under 35 U.S.C. 120 of, U.S. patent application Ser. No. 17/132,988, filed Dec. 23, 2020, issued as U.S. Pat. No. 11,551,568, entitled "SYSTEM AND METHOD FOR DUAL MODE PRESENTATION OF CONTENT IN A TARGET LANGUAGE to IMPROVE LISTENING FLUENCY IN THE TARGET LANGUAGE", which is a is a continuation of, and claims a benefit of priority under 35 U.S.C. 120 of, U.S. patent application Ser. No. 16/844,252 filed Apr. 9, 2020, issued as U.S. Pat. No. 10,984,667, entitled "SYSTEM AND METHOD FOR FORMATTING OR PRESENTATION OF CONTENT IN A TARGET LANGUAGE TO IMPROVE LISTENING FLUENCY IN THE TARGET LANGUAGE," which claims a benefit of priority under 35 U.S.C. § 119 to U.S. Provisional Patent Application No. 62/831,380 filed Apr. 9, 2019, entitled "SYSTEM AND METHOD FOR FORMATTING OR PRESENTATION OF CONTENT IN A TARGET LANGUAGE TO IMPROVE LISTENING FLUENCY IN THE TARGET LANGUAGE", which are hereby fully incorporated by reference in their entirety.

TECHNICAL FIELD

The present disclosure relates generally to linguistic learning. More particularly, embodiments of the present disclosure relate to the systems and methods for assisting in the learning of a second or 'target' language. More specifically, embodiments of the present disclosure relate to embodiments of language learning systems and methods that improve listening fluency in the target language through presentation of content in the target language, including an annotated or redacted visual presentation of content in association with the auditory presentation of the same content.

BACKGROUND

When a learner sets out to acquire a new language (referred to herein generally as a "target language") different from their mother tongue or other language in which they are already fluent, they will typically start with simple grammatical constructions and basic vocabulary (e.g. "I ate the egg") and gradually evolve, over a period of time, to tackle more complex constructions (e.g. "I would've eaten the poached egg, out of sheer politeness, were it not for my severe dairy intolerance"). With perseverance and a well-designed path, the beginner learner can eventually attain a high-functioning level of, or even native-level, fluency in reading, writing, and speaking.

However, the acquisition of "listening fluency" requires a different approach. Many language learners, otherwise, highly competent in the target language, struggle to understand native speakers speaking naturally in real-world situations, whether in conversation (especially on phone calls) or watching movies. Their ears cannot process the sound into meaning fast enough to keep up, and sometimes cannot understand anything at all if the speaker's accent is strong or they are speaking quickly and colloquially.

Many language teaching methods and tools fail in this respect because they expose learners to only artificially formal "made-for-study" speech, where the enunciation is slow, and the range of linguistic usage is limited. Both the sound and the content have been simplified to make it digestible to the learner. However, the neural circuitry humans have for decoding speech needs to learn using authentic speech, which has a very different sound from (even if it is symbolically similar to) the made-for-study form.

A different problem arises in most of the language acquisition tools that do expose the learner to sounds of authentic spoken language. This content is, by nature of the situation, too difficult for the learner to understand without some assistance, since repeated listening alone generally does not help.

Typically, these tools provide the learner with full transcripts and sometimes full translations so the learner can follow along. Unfortunately, a full transcript or translation offers too much help, and the work of understanding is borne by the learner's eyes rather than their ears. It is no longer listening practice, but rather reading practice with a soundtrack.

The learner then needs a middle ground, where they get enough assistance while listening to authentic spoken language so they are "in the vicinity" of comprehension, while leaving important work for the ears, to achieve actual comprehension. It is only by forcing the ears to listen actively that the appropriate neural circuitry can be trained.

In conjunction with ear training, the learner needs to grapple with real-world idiomatic usage that is typically hard to author in made-for-study materials. Even for learning products that feature authentic spoken audio, the interface provided to learners is one of "select a word and look it up in a dictionary", rather than working with bigger chunks (i.e. groups of words) and translating within the context of passage.

What is desired then, are improved language learning systems and methods.

SUMMARY

To those ends, among others, embodiments of a computer implemented language learning system and method for implementing or assisting in self-study for improving listening fluency in another language (e.g., a second, third, etc. language, generally referred to as a "target" language) are disclosed herein. Such embodiments may simultaneously present the same piece of content in an auditory presentation and a corresponding visual presentation of a transcript of the auditory presentation, where the two presentations are adapted to work in tandem (e.g., are synchronized) to increase the effectiveness of language learning for users.

Embodiments of such a language learning system allow a language learner to practice listening to dialog spoken in a variety of natural accents, styles and speeds, to achieve native-level listening skills to handle many situations in the real world, whether conversational, transactional, or consuming media. In addition to ear training, embodiments help the learner build a robust and practical passive vocabulary.

Certain embodiments may be adapted to focus a user's attention on an aspect of the presentation that may be most conducive to learning the target language and the presentation of the content may be adapted to allow a user to focus primarily on a single aspect of the presentation. For example, embodiments may utilize a visual display where the visual transcript of the auditory content being simultaneously presented may be partially or fully redacted.

In particular, embodiments may include a set of features that work, separately or in combination, to help a second (or other) language learner study with audio content in the target language. While embodiments are effective for learning with any kind of recorded language (including, but not limited to, audiobooks, radio plays, lectures, and music) embodiments may be especially useful with the most challenging material in mind: natural, unscripted speech that is highly idiomatic and distinctive to the age, locale, and cultural background of the speaker.

Thus, embodiments may include a number of features, that may be used alone or in conjunction with other features that are designed to help a learner improve their listening fluency in a target language working with such target language audio recordings. Some of these features pertain to the display of a written transcript of the words spoken, in the target language, from the audio recording, the visual redaction of certain words in that transcript, augmentations to the transcript with summarizing information that may help the learner, user interactions with certain elements in the transcript, animations within the transcript related to the playback of the audio recording, and selective focus of parts of the transcript. This group of features may be referred to as "transcript related features".

Other features, in some embodiments, pertain to the display of a written translation script of the transcript, typically in the learner's native language, augmentations to the translation script with summarizing information that may help the learner, animations within the transcript related to the playback of the audio recording, and selective focus of parts of the transcript. This group of features may be referred to as "translation script related features".

Other features, in certain embodiments, pertain to manipulations of the audio recording that give the listener more time to digest the sounds from the recording itself, or time to read other information provided to the learner to orient themselves better in the narrative. These features may be referred to as the "audio manipulation features".

In particular embodiments, other features pertain to ways for the learner to practice listening to challenging vocabulary from the audio recording they have selected to review during their study of the material. This group of features may be referred to as "audio vocab review features".

Additionally, in some embodiments, there are features that pertain to how the learner can navigate through the chapters (e.g., a discrete section which may, in one embodiment, each last 1-4 minutes) of a longer audio recording, in multiple modes of listening or study, in a way that efficiently reinforces what they have studied, accustoming their ears to the natural native-spoken sounds while working in harmony with typical attention spans. This group of features may be referred to as "study flow features".

To illustrate in more detail, in certain embodiments transcript related features and translation script features comprise the following. It will be understood that the features discussed herein are discussed together, however, embodiments may contain fewer, none or all of these features without loss of generality. "Word-level redaction" is an approach to substituting each word of the transcript with a bar or lozenge or opaque symbol (e.g., used interchangeably), so that some information of the underlying word is preserved visually. For example, in a Latin script language such as English or Spanish, the length of each redaction lozenge suggests the length of the word.

Alternatively, for a language like Japanese which uses multiple distinct scripts (Chinese characters known as "kanji", two native syllabaries known as "hiragana" and "katakana", and Latin script known as "romaji") the script type under redaction may be indicated by the type of fill for the redaction symbol. The number of spoken syllables needed for each Chinese character may be indicated by other visual elements.

"Word group presentation and interaction" involves the editorial selection of different classes of groups of words, which can be called "word groups" even when they comprise a single word. The different classes of word groups may include vocabulary that the learner can add to their "vocabulary list" for later review, "tricky bits" which can be common words but spoken in a way that are difficult for a non-native listener to understand (e.g. spoken in a heavy accent, or spoken fast with elision), "SIC" which are incorrect or non-standard usages (often said unintentionally by the speaker), and "notes" for uncommon proper nouns or less well-known cultural references. Each class of word group may be identified by, for example, a specific color of underline, and each may permit different affordances for user interaction.

"Selective redaction" describes a situation where only some of the words in the transcript are visually redacted, as described above. Having a variety of states with different levels of redaction allow the learner to choose just the level of help they need, suited to their individual command of the target language, so they can follow the story without too much friction, but still keep the ears working to fill in the gaps and discern the detailed meaning. The learner may choose to redact all words except certain types of word group (for example vocabulary and SIC). Alternatively, they may choose to redact all the words, and select words groups one by one as needed (for example by tapping the redacted word group on the display). Or they might use a combination of these two methods.

"Audio synchronized highlighting" describes how the current spoken word, word group, sentence, paragraph, speaker, and passage can be highlighted in the display of the transcript, whether fully redacted, partially redacted, or fully unredacted. By hearing the sound of a word at substantially the same time as that word is highlighted in the display in its redacted form gives the ear some hint of what to expect without revealing the full text. Similar highlighting can also apply to the translation script at the sentence, paragraph, speaker, and passage. As well as highlighting the current entities, for example in a specific color, the display can visually distinguish between what has been listened to in the transcript and translation script, and what has not yet been visited. This is useful in particular when the learner rewinds in the transcript to see where they rewound from.

"Passage hints" are an augmentation of the transcript by language editors (who may also select and annotate the word groups described above). As an audio story or conversation progresses the topic being spoken about can migrate from one subject to another. Non-native listeners can often "miss a turning" and find themselves lost in the wrong overall context. The language editor can add a short note, the "passage hint" similar to a sub-chapter title, to signify the change in subject. The learner may choose to automatically show the hint at the start of the passage in the audio, or may prefer to uncover them one by one as needed if they get lost.

"Speaker information" describes the visual display in the transcript or translation script of the name or role of the person in the audio recording who is speaking. This feature allows the learner to open a description of the speaker giving some extra context. When a learner listens to audio conversations or audiobooks featuring multiple characters it can be hard to distinguish them by voice, and also hard to remember how each of them relate to each other and the story.

"Context-sensitive assistance" describes how the visual presentation of the transcript and translation script may change, and how extra assistance features can be made available, when the learner becomes stuck on a particularly difficult sentence. The display may remove all the other content from the display, leaving room to show both the transcript and translation script for that sentence. The extra assistance might be in the form of a super slow "snail mode" playback speed, and the ability to loop the audio for the sentence for repeated focused listening. The learner may proceed sentence by sentence in this special mode. In another embodiment the extra assistance may be activated when the learner chooses a rewind action on the audio player.

In one embodiment, audio manipulation features may comprise the following. "Audio kerning", by analogy to text kerning in typesetting, describes a process by which spoken audio can be "time-stretched" in a natural sounding way which is particularly useful for ear training purposes in the target language.

Typically, audio time-stretching (and the inverse, time-shrinking) is done using a digital signal processing algorithm which doesn't alter the perceived pitch of the audio. It can however introduce distortions or "artifacts" in the sound, as well as creating an unnatural sounding speech. Embodiments may thus detect the natural pauses both between and within sentences or words in normal speech and elongate those without stretching the actual spoken words. In this way the learner is always hearing naturally spoken words, but has more "think time" while they listen so they are more likely to stay on track.

"Serialized attention" describes how the audio playback can be programmatically paused and unpaused as the learner consumes the chapter to help them concentrate more effectively. For example, when a passage hint is automatically displayed to the learner at the start of a passage, the player may be paused for a few seconds to allow the learner time to read and digest the hint, without the learner having to simultaneously listen to the next part of the audio in the target language. The audio player may be paused also when the learner interacts with a word group or views the speaker description as described above, again so that they can focus on just one thing at a time.

The novel "study flow" features center around respecting the typical natural attention span of learners, while also allowing different ways of listening to the same "chapter" of content in series to maximize the effectiveness of the ear training.

Working with chapters that are not too long, ideally four minutes or less of spoken audio, is important to help the learner master listening in digestible chunks, without suffering from mental exhaustion. After studying a chapter, taking advantage of the various assistance and augmentation described above, it is important for the learner to experience a "clean listen" through the same chapter, at the natural speed, without any assistance. At this point the learner should be familiar with the vocabulary, and the themes, and the sounds of the audio. Therefore, this final pass, listening as would a native listener, requires less concentration which also lets the native-spoken sounds sink into the brain.

The "audio vocab review features" describes a novel approach to reviewing and practicing vocabulary that the learner has encountered from the content they have studied. Whereas many language methods may provide a flashcard experience around vocabulary review, often implemented as a spaced repetition system (SRS), embodiments may take a different approach, focusing first on audio recognition of the words, and then understanding the meaning in the context of the audio story or conversation in which they appeared. Embodiments are thus useful when working with a form of the language where the usage is highly idiomatic and context sensitive.

Accordingly, in one embodiment a system for language learning may include a server and a client device executing a client application (e.g., the Jiveworld application). The server can receive an audio file having content in a target language and obtain a transcript of the words of the content of the audio file in the target language. Based on the audio file and the transcript of the words of the content the server can generate a timestamp file including a word level timestamp for each word of the transcript, the word level timestamp corresponding to a time in the audio file associated with where that word occurs in the content. The server may also generate a transcript and timing file ("T&T" file) corresponding to the audio file based on the transcript and the timestamp file. The transcript and timing file may comprise each word of the transcript of the content of the audio file and the associated word level timestamp for each word of the transcript of the content of the audio file.

In this embodiment the client application at the client device can obtain the audio file and the corresponding transcript and timing file and auditorily present the content of the audio file using an audio player at the client device. Simultaneously with the auditory presentation of the content of the audio file the client application may dynamically generate an interface using the transcript and timing file where the interface includes a visual display of a visual transcript of the content in the target language.

This visual display of the visual transcript of the content is synchronized with the auditory presentation of the content by the audio player and includes a visual transcript of a set of words of the content where the visual transcript of the set of words of the content includes a set of redacted words and a set of unredacted words. Each of these redacted words in the visual display are redacted by presenting the redacted word as a corresponding lozenge in the visual display, the lozenge sized according to the corresponding redacted word while each of the set of unredacted words are presented in the visual display in text of the target language. In particular, in certain cases the lozenge may be shaped based on a font used by the interface for the target language and the size of the corresponding word, and may indicate other properties of the word in written, spoken, or grammatical form.

Additionally, the visual display of the visual transcript of the content is synchronized with the auditory presentation of the content by determining that a word is being presented in the auditory presentation of the content based on the word level timestamp associated with that word in the transcript and timing file and a state of the audio player, and the presentation of that word in the visual display is highlighted substantially simultaneously with the auditory presentation of that word in the auditory presentation, where if the word is in the set of redacted words the lozenge corresponding to that word is highlighted, and if the word is in the set of unredacted words the textual presentation of the word is highlighted. This highlighting may include, for example, changing a color of the visually presented word when it is presented auditorily.

In certain embodiments, the set of unredacted words include one or more word group types, the word group types include vocabulary, incorrect usage, tricky bits or annotated words. The one or more word group types may, for example, be selected by a user using the interface of the client application.

In some embodiments, the one or more words is determined during dynamic generation of the interface based on user interactions with one or more words in the interface.

In some embodiments, a ratio of the set of redacted words to unredacted words may be altered based on a desired amount of assistance.

In certain embodiments, the pauses that occur naturally in speech, in between or within sentences, in the audio file can be lengthened programmatically, while still keeping the synchronization of words in the auditory presentation and the words in the visual transcript, thereby allowing the learner more "think time" while listening, but without changing the nature or character of the spoken sounds.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1B:
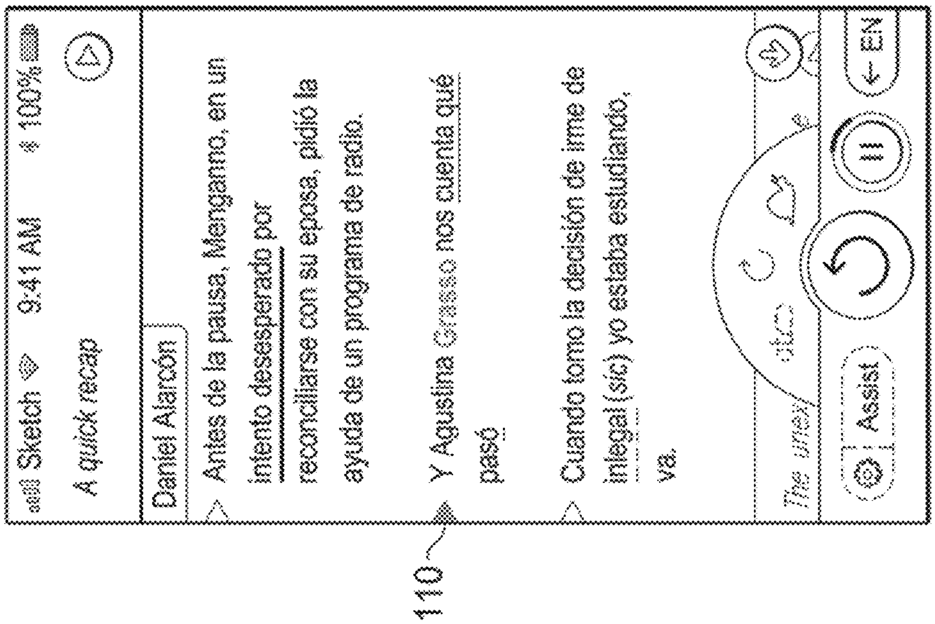
FIGS. 1A and 1B are depictions of interfaces that may be utilized by embodiments of a language learning system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. Natural speech is innately hard to understand for most non-native speakers, and direct exposure is important so that they can acquire the skills necessary to have real-world conversations. Reaching a level at which the learner can have real conversations with almost any native speaker of the target language (which is far beyond what is commonly referred to as "conversational ability") is an important milestone in language acquisition. It marks the point where the learner can quickly improve their mastery of the target language by using it, rather than studying it, thereby accelerating to actual robust fluency in the target language.

Simplifying the spoken material itself as a means of training the learner in listening comprehension, so that it is closer to what the learner can understand unaided, is a poor approach. Speaking slowly is not the same as slowing down normal speech. And the process of manicuring conversations for didactic purposes removes the natural warp and weft of the language. It may have the veneer of the real language, rather like vinyl can have the veneer of real wood, but it is far from the same and it cannot be fashioned in the same way.

The challenge then is how to define a method that, over a reasonable time, say months, carries the learner to a level where they can listen and understand natural speech unaided, while using the very material they cannot understand. The learning curve has to be shallow enough to be manageable, but steep enough so there is material upward progress.

Prior solutions are problematic, first, they may offer the learner a full transcript and full translation of the recorded material so they can follow along. As a regular aide these solutions offer too much of the wrong kind of help. Written words are hard not to read, and reading can short-circuit the ears: the learner hears the words after the words are already decoded, without exercising the part of their brain for decoding the native sounds. Prior solutions may also give the learner an interface to select a word in the written transcript and show the dictionary definition for that word. This feature is less useful than it might first seem. Natural spoken language (and the type of rich prose found in audiobooks and other audio presentations) is rich in subtle usages and expressions that are context dependent, not context-free as with a dictionary definition.

Generally, then, one problem with these previous types of study applications is that most study applications and methods expose student only to 'designed-for-classroom' speech, where the pronunciation is clear and formal, and which uses limited constructions and vocab. It is a designed speech—designed around a language curriculum. The problem is when the student can understand, say, Spanish when spoken in the designed-for-classroom form, but cannot understand it in its natural forms (e.g., the forms in which it as actually spoken by native speakers in common usage).

Another problem with these language applications is that the presentation of the full visual text or transcript in association with the auditory presentation naturally shifts the emphasis to the visual presentation as opposed to focusing on comprehension of the auditory presentation. For example, the problem with watching foreign language TV as a method of ear training, for most learners, is that without the subtitles it is too hard to follow, and with the subtitles (transcription or translation) in the visual presentation it then becomes a reading exercise, not a listening exercise. Since a goal of language learning is to improve listening fluency it is desired to make sure that the ears are doing enough work so that they are getting trained, while still getting enough help so that the student can get through the challenging audio material.

Active study always benefits from focused attention. This is more so the case for studying listening, since the activity happens in real-time. A person has no control over the sound waves hitting their ears, so the listener has to ride those waves and stay on top of the meaning. If a learner finds herself stuck thinking about something said a few seconds ago, they will likely miss what is coming at them right now: they have fallen off their semantic surfboard so to speak, and it can be hard to climb back on. This situation further impedes the ability of a language learner to study the language to improve listening fluency in the target language.

Embodiments of a computer implemented language learning system and method for implementing or assisting in self-study for improving listening fluency in another language (e.g., a second, third, etc. language, generally referred to as a "target" language) are thus disclosed herein. Such embodiments may simultaneously present the same piece of content in an auditory presentation and a corresponding visual presentation of a transcript of the auditory presentation, where the two presentations are adapted to work in tandem to increase the effectiveness of language learning for users.

Embodiments of such a language learning system allow a language learner to practice listening to dialog spoken in a variety of natural accents, styles and speeds, to achieve native-level listening skills to handle many situations in the real world, whether conversational, transactional, or consuming media (such as TV shows, movies, radio shows and podcasts). In addition to ear training, the embodiments help the learner build a robust and practical passive vocabulary (e.g., words that are recognized, even if not employed in speech by the learner).

The listening brain is a pattern recognition learning machine. Accordingly, embodiments are based on the thesis that the brain should be fed the real spoken content for it to internalize those patterns. Embodiment may thus include various aspects, including transcript based redaction, speed control or presentation of content, highlighting 'tricky bits' (sections of spoken audio that might be especially hard to understand for non-native ears), notes on unconventional or incorrect usages (malapropisms, grammatical deviations), and general contextual notes on pronunciation.

For this reason, embodiments as disclosed herein (which may also be referred to without loss of generality as the Jiveworld system or application, Jiveworld technology or just Jiveworld) may be especially useful when applied to recordings of language spoken by native speakers for native speakers in a broad range of natural environments, though embodiments may be usefully utilized in other contexts as well. Specifically, while embodiments may be usefully applied with natural spoken audio recordings—for example, radio interviews with native speakers or audio books or magazines—it could also be applied to almost any other content desired like music with lyrics in the target language, or video content.

Certain embodiments may be adapted to focus a user's attention on an aspect of the presentation that may be most conducive to learning the second language and the presentation of the content may be adapted to allow a user to focus primarily on a single aspect of the presentation. In particular, embodiments of the interface have been adapted to give the user (i.e., learner or listener) just one thing at a time to focus on, as one goal of the Jiveworld application is to keep the listener on the "edge of understanding" providing them enough context so they know roughly where they are in the visual transcript, but not too much help that there is no work for their ears and brain to do in following the auditory presentation.

For example, in the Jiveworld system that uses a visual display where the visual transcript of the auditory content being simultaneously presented may be partially or fully redacted. The redaction may take the form of a "lozenge" (e.g., a visual obfuscation of a particular word or set of words) that obscures each redacted word of the transcript (e.g., while any unredacted words may appear as text of the target language). Such a lozenge may be approximately the size (e.g., length or height) of the word being redacted, allowing a user to take in a word boundary without showing the actual word. The length of this boundary may give some hint of the written and spoken length of the word (especially for an alphabetic language), and thus help nudge the learner towards hearing more accurately.

Moreover, either the presented text or the redacting lozenge may be presented in a specific (e.g., contrasting) color. The specific color may be used in the visual presentation to provide a visual indication of something related to the word, or location of the word, which could, for example, be the word currently being spoken (e.g., in a corresponding auditory presentation), or a contextual note or hint used to turn the listeners attention to a change in the subject under discussion in the auditory content being presented.

Thus, the visual presentation may be dynamic, with, for example, the color of the text or lozenge may change based on (and in association with) the auditory presentation of the content. Related to this, in certain embodiments, pauses may (e.g., automatically) be injected into the auditory presentation of the content when such a note or hint is presented in the corresponding visual presentation of the content (e.g., since it is desired to keep the listener from trying to read one thing while listening to something different).

The presentation of the content according to embodiments of a language learning system may also be configured for how humans adapt and learn and be adapted to manage the attention of users accordingly. Rather like training a particular muscle in the gym, there is a natural work and recovery cycle for concentration in studying. If the period of concentration is too long then the concentration is not sustainable, while too short a period impacts learning momentum and listening resilience. Accordingly, embodiments may present content according to such a work and recovery cycle to get sustained progress in ear training.

In particular, embodiments of the Jiveworld language learning system content presentation for listening may be based on 'sprints' of listening effort that cover audio segments that are a certain length (which we refer to as "chapters"). This length may be for example, around 100-250 seconds, though other lengths may be utilized according to need or desire. If, for example, an audio piece is a certain length (e.g., 20 minutes long), the audio segment (and corresponding visual presentation of text) might be divided up into 100-250 second chapters (e.g., around ten chapters when the content is 20 minutes long). In certain embodiments, the Jiveworld application guides the learner to listen to each of these chapters at least twice in succession (colloquially referred to as 'at least two coats of paint'). A first pass may be done with assistance—this will require more deliberate attention (e.g., akin to cycling uphill) as the material is brand new with new challenges and vocabulary. This presentation will typically take 2 to 4 times the audio length, so a two-minute chapter might take 4-8 minutes of study. A second pass can then be presented without (or with more limited) assistance. This second presentation may be important to reinforce the new material listening at natural speed without needing to pause to look things up. This requires much less concentration effort (like cycling downhill). This more limited assistance may include, for example, more redactions or fewer visual indicators, etc.

In other embodiments, a user can choose more or fewer iterations. However, embodiments of the interface may encourage this two pass learning. After listening to each chapter (e.g., segment of audio content and corresponding visual transcript) twice, and working through the vocabulary study flow for any words they have selected on the way, the user may be able to listen to the full length of audio in one go with relative ease.

Figure 1A:
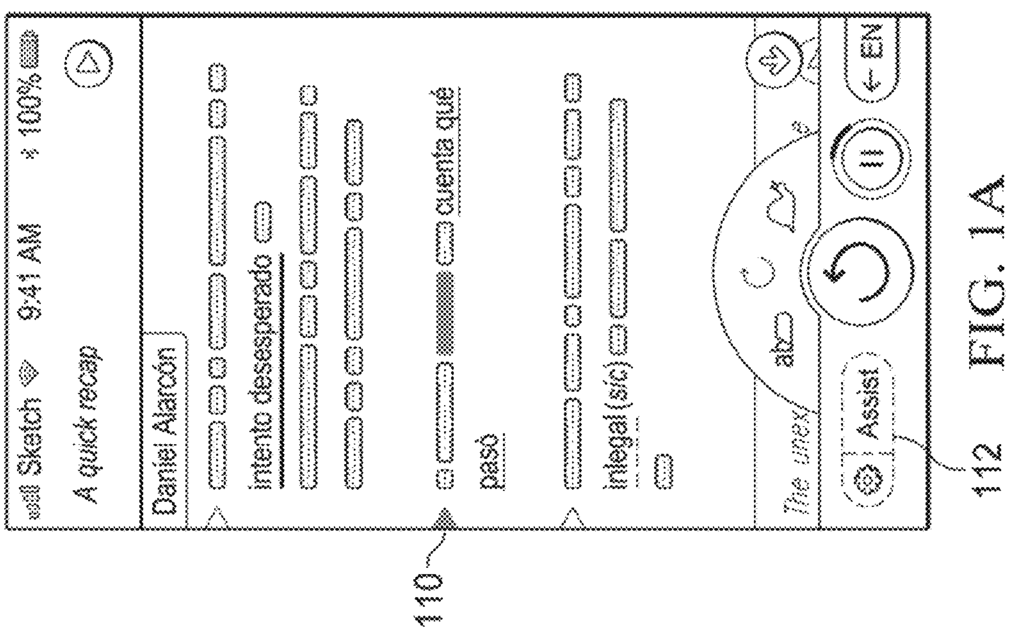

Embodiments of the design and implementation of the Jiveworld application will now be discussed in more detail. Referring first to FIGS. 1A and 1B, embodiments of an interface for the Jiveworld application are depicted. The interfaces show embodiments of a visual presentation of a partially redacted and a fully unredacted transcript (e.g., text that may be displayed in conjunction with a corresponding auditory presentation of the content or as a standalone visual presentation).

As can be seen, embodiments may present a visual transcript that is a representation of the simultaneously presented spoken transcript that allows individual words of the transcript to be either shown or obscured ('redacted'). Moreover, as will be discussed, embodiments may also have a pointer 110 (e.g., in a particular color such as teal) in the left margin indicating the current sentence (e.g., being presented in the corresponding auditory presentation).

FIG. 1A shows a spoken passage with most of the words redacted, replaced by solid bars (referred to as "lozenges"). FIG. 1B shows the same passage completely unredacted. Note that according to embodiments the visual presentation is dynamic. Thus, the current word (redacted or not) that the listener is hearing in a corresponding audio presentation of the content (e.g., in the audio track) being presented is highlighted (e.g., in teal, or another color corresponding to a currently presented word) in real time. In other words, if the current word being presented in the auditory presentation is redacted, the lozenge redacting that word in the visual presentation may be highlighted, while if the current word being presented in the auditory presentation is not redacted, the text for that word in the visual presentation may be highlighted.

Having these redacted words in the visual presentation may serve many purposes. Among others, the use of redacted words allows embodiments of the Jiveworld application to fine-tune the amount of assistance given to the user as they listen, keeping them on the "edge of understanding". Thus, the ratio or percentage of redacted words to unredacted words in the visual transcript may be varied based on a desired amount of assistance to be provided to a user. Depending on the settings or other criteria, embodiments of the Jiveworld application may show in the visual presentation, for example, only certain vocabulary words as unredacted (e.g., with the other words of the visual transcript highlighted).

The use of redacted words may also allow the user to visually follow and navigate the visually presented script in a consistent way, in particular by rendering the redaction lozenge at substantially the same width as the word, in place where the word would be. This treatment prevents the need to recalculate the layout of the transcript, and thereby allows the eye to stay focused in the same place on the screen (e.g., the word or lozenge highlighted (e.g., in teal or another color)), as in FIGS. 1A and 1B, whether in the redacted or the unredacted form. Moreover, as the redaction lozenge is approximately the size of the word, the redaction lozenge allows the visual presentation to show the word boundaries of the visually presented text (e.g., even when the text itself is not shown for that word in the visual presentation). Showing the word boundaries without showing the words helps the user's brain organize what it hears into symbolic chunks. The non-native ear often mishears words by confusing the boundaries between them. Showing the word boundaries aids in alleviating such confusion in users of the Jiveworld application.

Figure 2A:
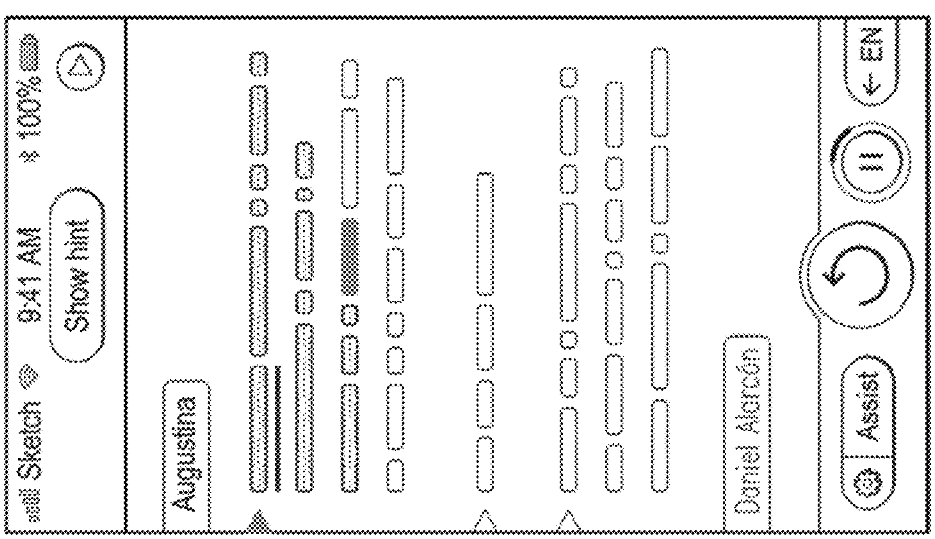
FIGS. 2A, 2B and 2C are depictions of interfaces that may be utilized by embodiments of a language learning system.
Figure 2B:
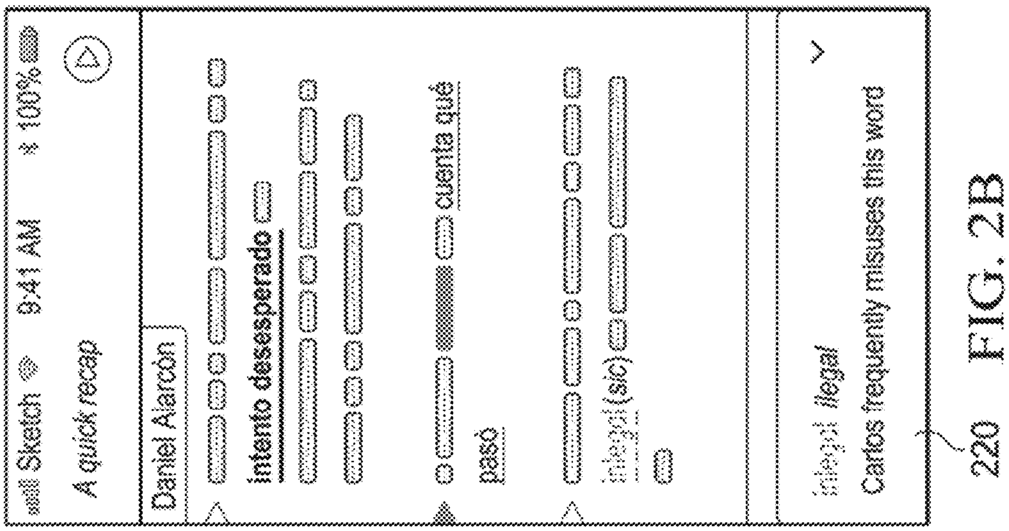
Figure 2C:
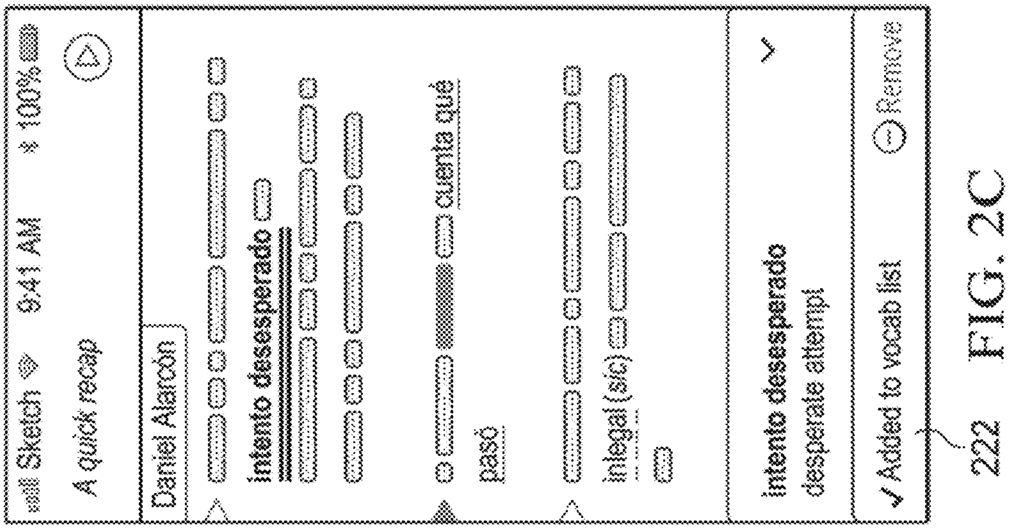

FIGS. 2A, 2B and 2C depict embodiments of other interfaces of the Jiveworld application. These interfaces depict embodiments of the use of redacted words to allow the Jiveworld application to fine-tune the amount of assistance given to the user as they listen. This assistance may comprise levels ranging, for example, from fully redacted transcript, to a partially redacted transcript, to a fully unredacted transcript. Specifically, in certain embodiments, the Jiveworld application can control the amount of assistance to the learner while they are listening by unredacting certain classes of words or word groups (collectively word groups). Consider four different types of word groups (other examples are possible and are contemplated herein) that may be left unredacted (e.g., and emphasized) in visual presentations of the content:

- Vocab or Vocabulary—selected words or phrases that are less common and may be unfamiliar to a learner may be unredacted in the visual presentation. FIG. 2B shows "intento desperado" as one example of a less common phrase that may be left unredacted (e.g., and emphasized with a colored underline such as a green underline) as an example.
- Incorrect Usage or SIC— words or phrases in the content that do not follow the standard rules of grammar, are incorrect words, or are words used in the wrong context (e.g., unintentionally by the speaker) may be unredacted in the visual presentation. FIG. 2B shows “inlegal” unredacted (e.g., and emphasized in a color such as orange) as an example.

“Tricky Bits”—groups of words that are spoken fast in the auditory presentation, are elided, or are otherwise difficult for a non-native listener to understand, even if the words themselves don’t qualify as interesting vocabulary. The tricky bits may be unredacted in the visual presentation. The phrase “cuenta qué pasó”, unredacted (e.g., and emphasized in a color such with a dotted grey underline) in FIG. 2B is one such example of the presentation of a tricky bit in an interface of embodiments.

Annotations—These are words, phrases, or names in the content that might have some cultural, historical or linguistic significance that the learner might not be familiar with, to which an editorial note could be added in the visual presentation.

Some of the above, or other unredacted portions, of the transcript might require accompanying notes or explanations. Certain embodiments of an interface presented by the Jiveworld application may thus provide explanatory notes synchronized with the auditory and visual presentations. FIG. 2B shows a panel 220 that may pop up from the bottom of the interface, referred to as a “slide-up panel” (e.g., when the unredacted incorrectly used “inlegal” is being spoken in the auditory presentation, when the term “inlegal” is selected in the visual presentation by the user, when the visual presentation is displayed, etc.) explaining what the speaker in the auditory presentation of the content could have said (e.g., if using more standard Spanish usage) instead of “inlegal” (e.g., a correct term in Spanish, like “ilegal”).

The embodiment of the interface in FIG. 2C shows a slide-up panel 222 with a definition for the vocabulary word unredacted in the visual presentation of the interface (e.g., “intento desperado”), with some other actions that might control how the vocabulary word is added to a vocabulary review list. In each of these cases selecting the unredacted (e.g., and highlighted) word group (e.g., a vocabulary word, a tricky bit, an annotation, an incorrect usage, etc.) in the visual presentation by tapping on the word group (e.g., using a device with a touch-screen) or otherwise selecting it (e.g., using a mouse click or other input device), in the transcript could reveal this panel.

Embodiments of the language learning system can automatically unredact any, or all, of these word groups according to a set of rules. FIG. 2A shows a transcript with all the words redacted, but the first redacted word has a colored (e.g., green) underline, indicating that it is a word group of interest (e.g., a vocabulary word for instance). Tapping (or otherwise selecting using a computing device, which will collectively be referred as tapping or selecting herein without loss of generality) this on the screen would unredact just that word group. A further tap may show a definition panel for that word or words in the interface (e.g., panel 222 in FIG. 2C).

As discussed, at least two desires of embodiments of the Jiveworld system are first to tailor the assistance given to users to keep them on the “edge of understanding” and second, to provide a user interface that is easy to use. In certain cases, these two desires may be difficult to reconcile. One solution is to provide a simple on/off assistant switch in the interface, illustrated in some FIGURES (e.g., assistant switch 112 FIG. 1A) such as a button in the bottom left of the player screen, that is highlighted (e.g., yellow when active).

Figure 3C:
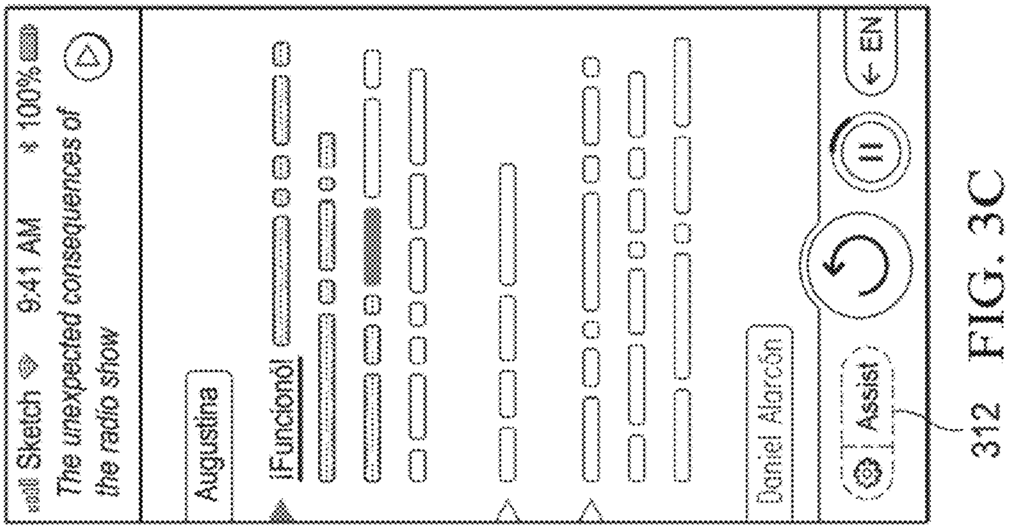
FIGS. 3A, 3B and 3C are depictions of interfaces that may be utilized by embodiments of a language learning system.
Figure 3B:
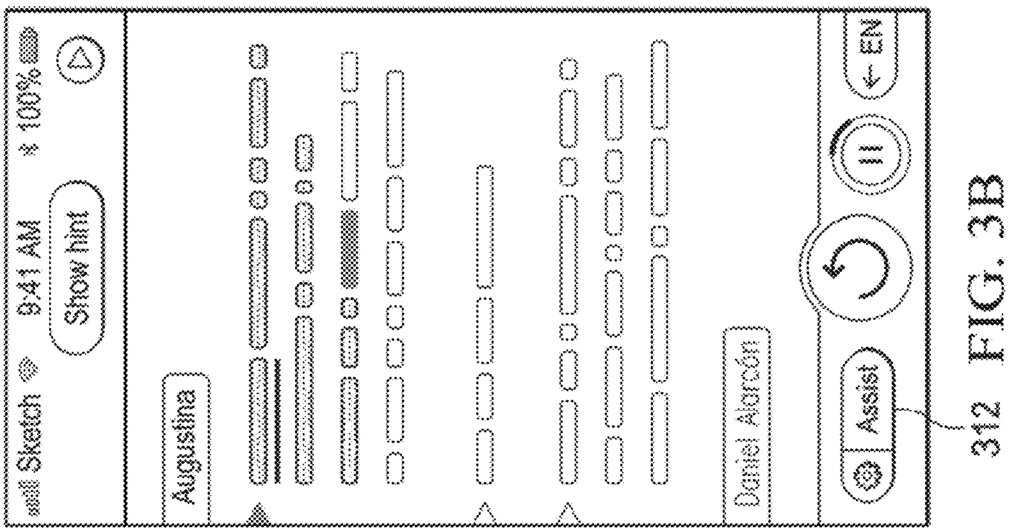
Figure 3A:
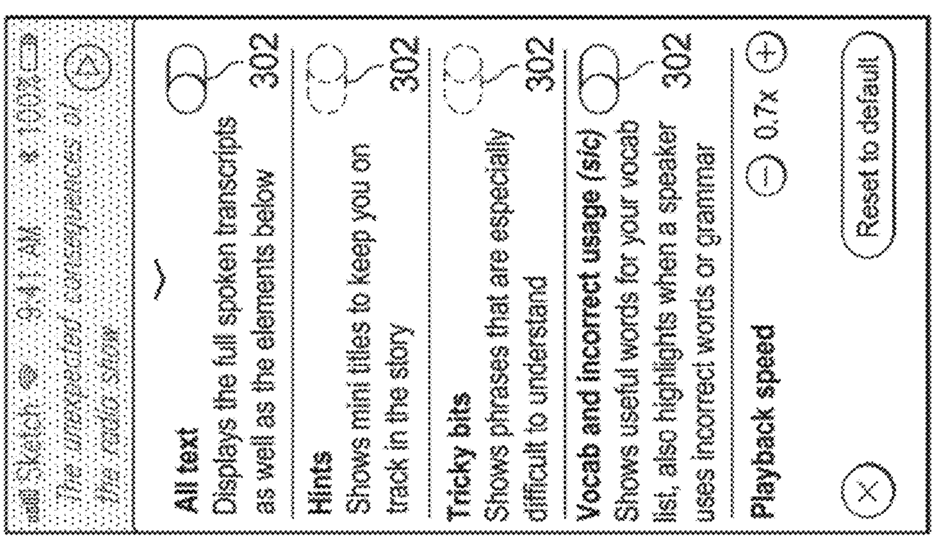

However, other embodiments may provide a way for users to more specifically tailor the types of assistance they get when they switch the assistance on. FIGS. 3A, 3B and 3C depict embodiments of still other interfaces of the Jiveworld application. FIG. 3A shows a settings screen interface that allows the user to tailor the types of assistance presented by, for example, selecting which kinds of words groups to show automatically unredacted, or even to show everything unredacted. By using the “slide” buttons 302 a user may select whether all the text, hints, tricky bits or vocab and incorrect usage are highlighted or displayed. The user may also use the settings screen interface to set the playback speed (e.g., how quickly the auditory content is presented relative to the original auditory transcript of the content). This may be, for example, a slow-speed setting which allows a custom audio time-stretch parameter (shown in the example depicted as 0.7×, or 70% of normal speed) to make it easier to follow.

Interfaces according to embodiments may also be simplified by using a single slider letting the user select from a series of preset assistance levels. Users may prefer the less fine-grained control in return for a simpler interface. Embodiments may also allow the assessment of different gradations of vocabulary or “tricky bits” and may expose settings to show more or less of gradations of tricky bits depending on the learner’s level in the target language. Note that even when assistance is off, interfaces can still make the passage hints, vocab, notes etc. accessible (e.g., by tapping on a touchscreen device) on an instance-by-instance basis as illustrated.

The “Assist” button 312 in FIGS. 3B and 3C (bottom-left of screen) show how the user can control whether assistance is on (e.g., when the button is highlighted such as in yellow), or off (e.g., when the button is highlighted a different color such as in white). When assistance is off everything in the visual presentation is redacted by default, allowing the user to tap on the individual word groups (e.g., each individual lozenge presented in the visual presentation of the content) to unredact that word group. When assistance is on, only the types of assistance selected in the settings menu (e.g., through the menu depicted in FIG. 3A) may be enabled.

Other than explicit controls for auto-unredacting word groups (e.g., types of word groups), the system may have other ways of assessing the appropriate level of assistance. For example if the user starts with everything redacted but tends to tap on “tricky bit” word groups frequently, this could be a signal for to the application to unredact these “tricky bits” by default for the user. Thus, the system may have some threshold or time period whereby if the user interacts with a particular type of word group over the threshold amount during a given time period those types of word groups may be unredacted for that user. These thresholds and time periods may be, for example, different based on the type of word group, the user, the content being presented or other criteria.

Contextual based menus may also be used by the Jiveworld application in certain embodiments. For example, another way of allowing a user to unredact words is by offering them extra options when they rewind the audio presentation of the content. When dealing with challenging listening material the language learner will often need to rewind a short section to listen again before moving on. Jiveworld makes this action both easy and useful. When the user rewinds the content presentation both the audio content being presented and the corresponding visual presentation of the content reflect the rewind state.

Specifically, the visual presentation may be returned to a point such that the highlighted word group in the visual presentation corresponds to the place in the audio content where the audio content was rewound (e.g., to the word or word group being presented in the audio content).

However, rewinding does more than just move the listening position back (e.g., move the audio content and visual presentation back by some amount). When the user rewinds, it is a strong signal that they might need some extra help to engage with the section of content being presented. It might be a specific word that they need to understand, or it could be a whole construction they missed; it might be because they're unfamiliar with the words used, or the style of speaking confused their ears, or for some other reason. Thus, embodiments of interfaces as used by the Jiveworld application may be context sensitive; utilizing the user interaction for a rewind request to present additional information and affordances in the visual presentation of the content (e.g., regarding one or more types of word groups).

Figure 4A:
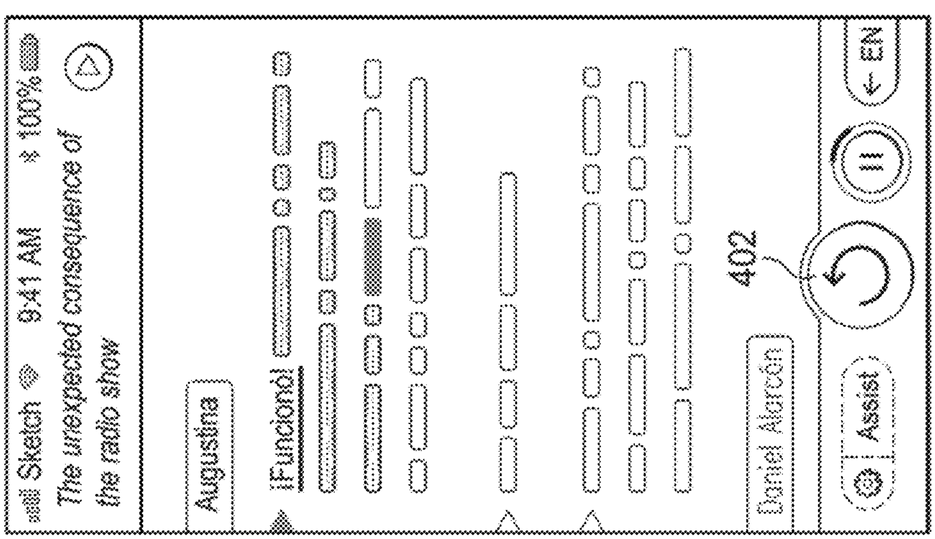
FIGS. 4A, 4B, 4C and 4D are depictions of interfaces that may be utilized by embodiments of a language learning system.
Figure 4B:
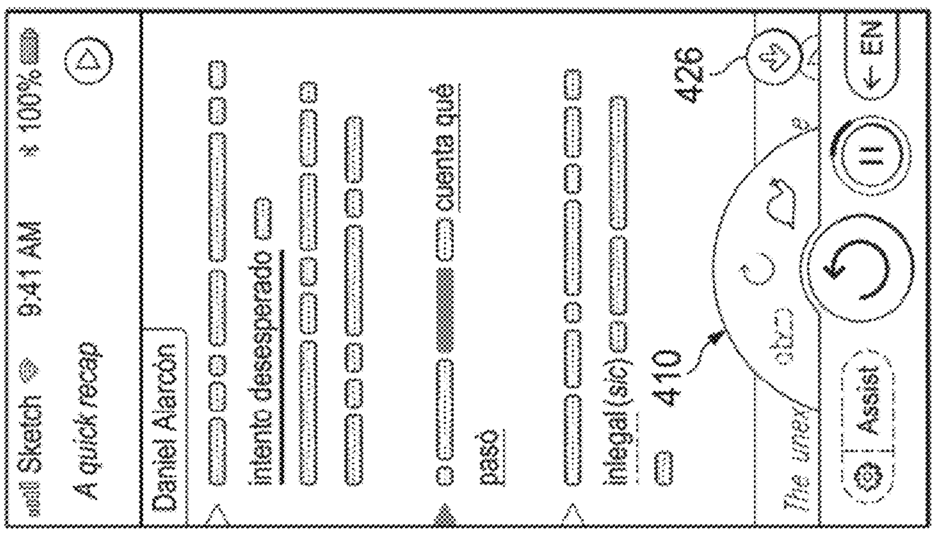

FIGS. 4A, 4B, 4C and 4D depict embodiments of contextual based interfaces of the Jiveworld application that may be used, for example, when rewinding a (e.g., auditory) portion of a transcript. FIG. 4A shows a large rewind button 402 in the bottom center of the screen. When that rewind button 402 is tapped or held the audio players presentation of the audio content and the (e.g., highlighted) position in the visual presentation of the transcript of the content jump back (e.g., phrase by phrase or word by word). The tapping or holding of the rewind button 402 puts the application into a "rewind state" (e.g., until the audio has played forward again to the position where they initiated the rewind). In this rewind state, embodiments of an interface may show an extra options menu 410 as depicted in FIG. 4B, in an arc around the rewind button.

This menu 410 and the options are useful because, in most cases when a user rewinds the audio transcript it is quite probable that they didn't understand the audio and want to relisten to the preceding phrases. This is an appropriate context to offer them extra help if they want (e.g., to assist in what is presumed to be a lack of understanding).

Figure 4C:
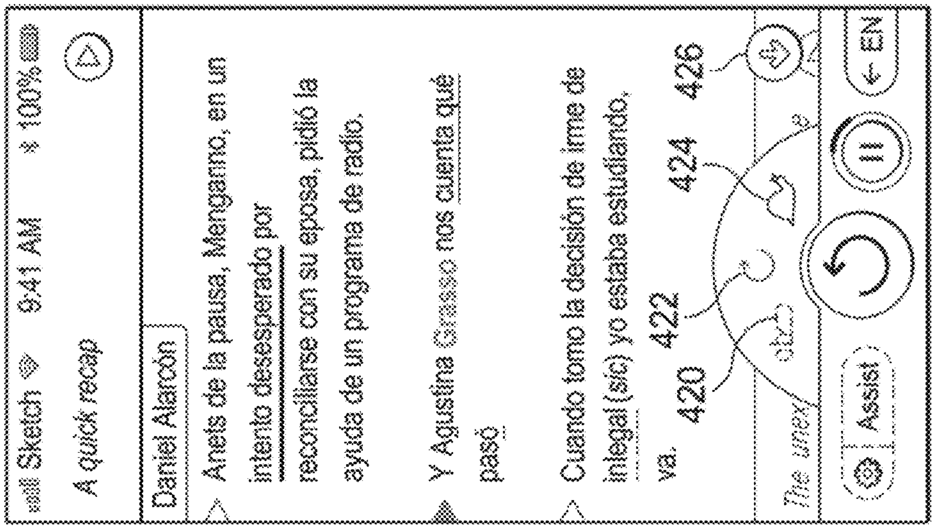

One of these options buttons 420 (e.g., the left-most of the three in the black arc— can trigger the unredaction of all the text. FIG. 4C shows this button 420 highlighted (e.g., in yellow)—after the user has tapped it—with the text above in the visual presentation all unredacted. This "show text" option button 420 thus switches the visual presentation of the content to the full unredacted text for that section.

Other options offered while in a rewound state are the forward option button 422 which allows reversing one of the rewind taps in case the user went back too far and the slow listen option indicated by the snail icon 424. This slow listen option may add additional time stretching on top of what may already be activated in assist mode (e.g., as set in the assistance menu as discussed above).

Again, FIGS. 4A and 4B show embodiments of interfaces of the Jiveworld application before and after the rewind button 402 (large button located at the bottom center of the screen) is pressed or held. Each tap of the rewind button may move the cursor (e.g., as represented by the highlighted word or lozenge in the visual presentation) to a semantically logical place such as the beginning of a sentence or to the beginning of a clause in a longer sentence. In the example interface of FIG. 4B the presentation of content has been stepped back a number of times relative to the example in the interface depicted in FIG. 4A.

In certain embodiments, the Jiveworld application saves the location in the content that was being presented before the rewind button 402 was pressed. This location may be tracked by the Jiveworld application in a "furthest played" marker (or variable). The user may be made aware they are in the rewind state by the display of the extra actions offered to them in the arc menu 410 above the rewind button 402 in the visual presentation of the content, and in the visual treatment of the script ahead of the cursor (e.g., as represented by the highlighted word or lozenge in teal color in the visual presentation). When the cursor has joined back up with the furthest played point (e.g., when the highlighted word or lozenge corresponds with the point in the content that was being presented before the rewind button 402 was pressed as maintained by the "furthest played" variable) the visual interface would revert back to how it was originally in FIG. 4A (e.g., the menu 410 may disappear and the Jiveworld application may be taken out of the rewind state). The user can force the player to the furthest listened state (e.g., to the furthest played marker) at any time using the down arrow icon 426 to the right of the arc menu 410.

Figure 4D:
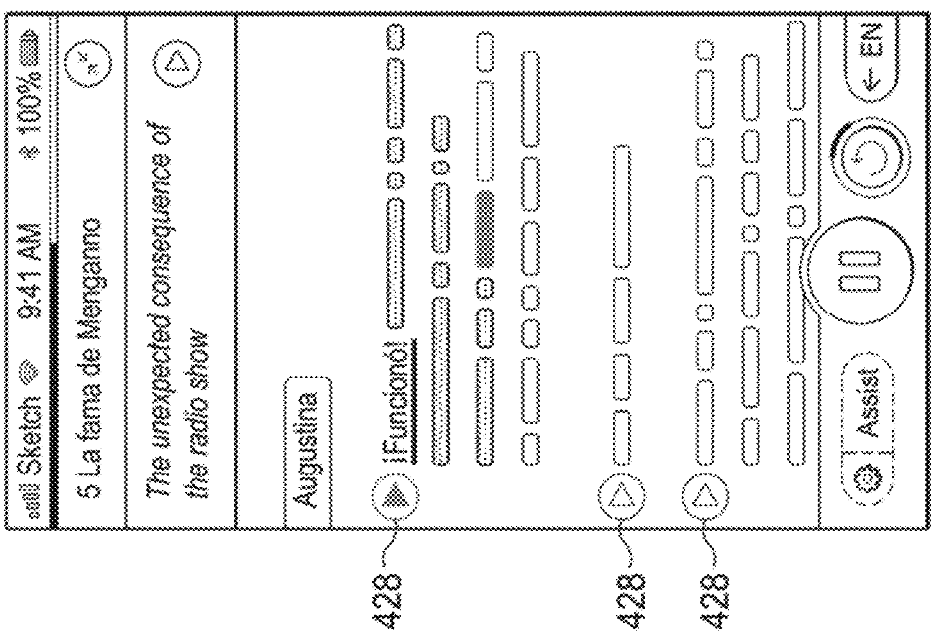

An additional way of jumping back (or forward) in the presentation of the content (e.g., both the visual presentation of the content and the auditory presentation) is shown in FIG. 4D. In this case there are buttons 428 in the left margin of the visual presentation that will cause the presentation of content to move to the beginning of a corresponding sentence (or other portion) of content. These buttons 428 could be revealed by, for example, explicitly pausing the player (e.g., pressing a pause button on the interface) or by a swipe-right (or other) action on the main body of the visually presented transcript of the content. This is yet another illustration of why it is useful to be able to represent the transcript visually in the visual presentation in redacted form (e.g., with lozenges covering one or more words or word groups of the visually presented transcript of the content): the visually presented transcript provides the user an easy way to navigate by scrolling to a part of the displayed transcript. The speaker labels (e.g., displaying "Augustina" in FIG. 4D) and hints (e.g., displaying "The unexpected consequence of the radio show" in FIG. 4D) that may be presented in association with the visually presented transcript give extra context while a user is manually scrolling that a user would not be provided with a traditional horizontal scrubber bar found in an audio or video player.

Figure 5A:
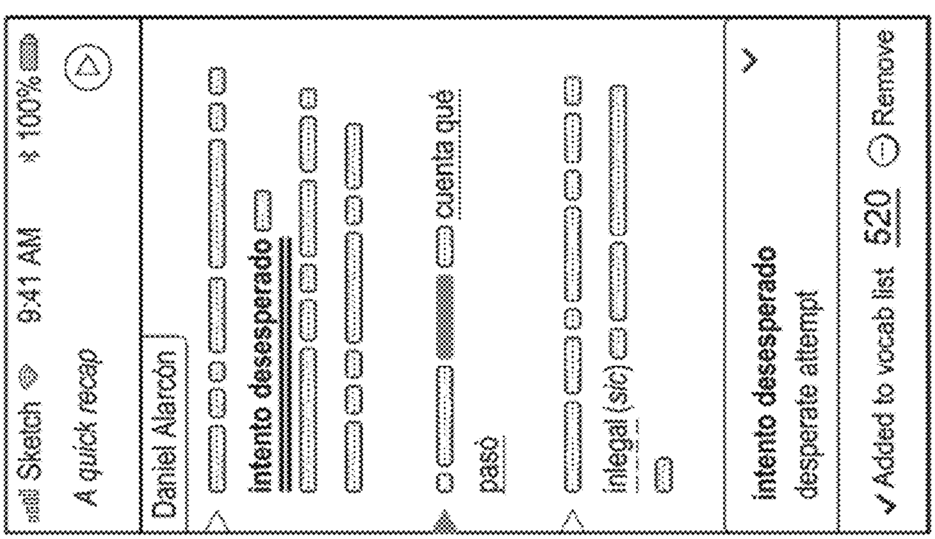
FIGS. 5A, 5B and 5C are depictions of interfaces that may be utilized by embodiments of a language learning system.

Embodiments of the Jiveworld application and associated interfaces may also improve understanding by allowing greater passive vocabulary acquisition. Focusing specifically on the passive vocab acquisition, embodiment may utilize a vocabulary review process that is based on audio recognition first and foremost, making it complementary to the processes and techniques employed for the listening practice described above. FIG. 5A depicts an embodiment of an interface that may be utilized by the Jiveworld application where a user can elect to add or remove a vocab element from a vocabulary list (shown in the panel 520 at the bottom of the interface which may be a slide-up panel or the like).

Figure 5B:
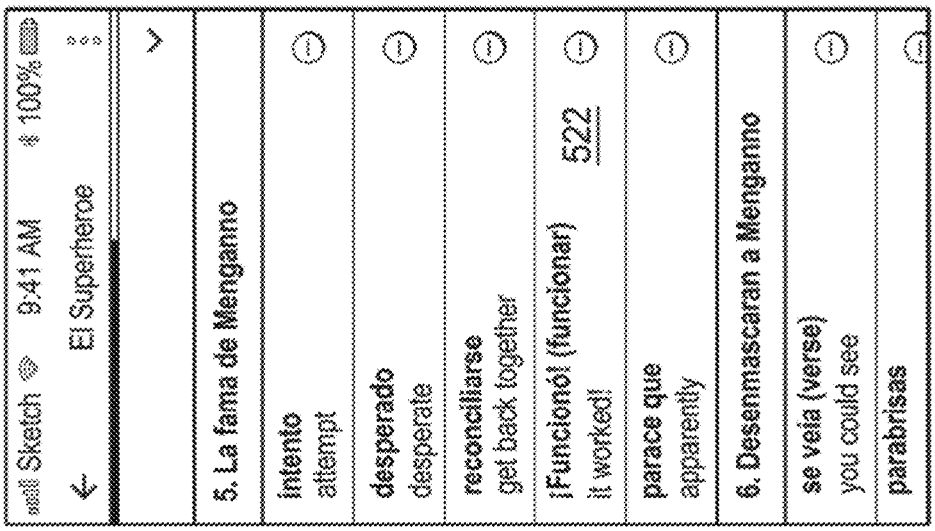
Figure 5C:
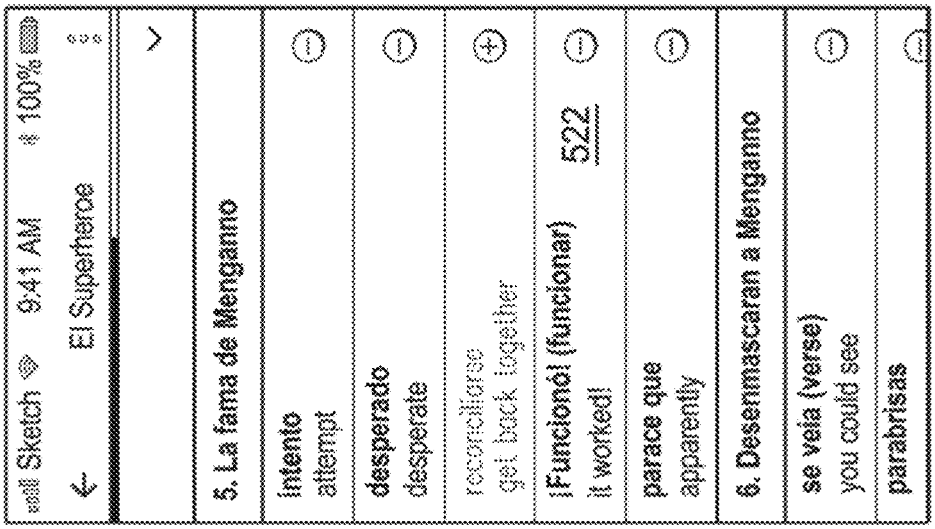

FIGS. 5B and 5C show embodiments of views of the vocabulary list that may be maintained for a user which allows the user to view and remove elements (e.g., 522) from a vocabulary list that may be maintained for a user. The user can thus work through their vocab list in the context of the passages where they encountered it (e.g., there are references to the section of the original content in which the vocabulary in the list was originally encountered).

Figure 6A:
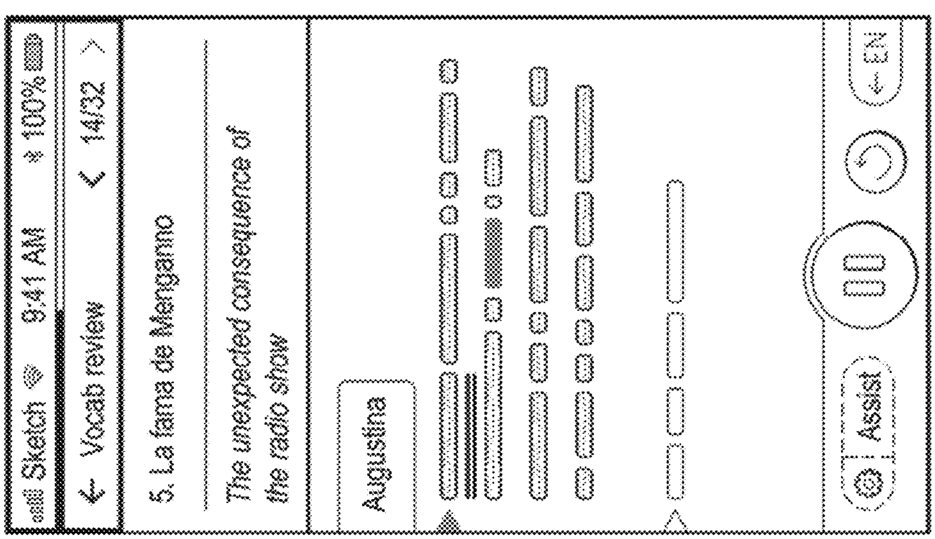
FIGS. 6A, 6B and 6C are depictions of interfaces that may be utilized by embodiments of a language learning system.
Figure 6B:
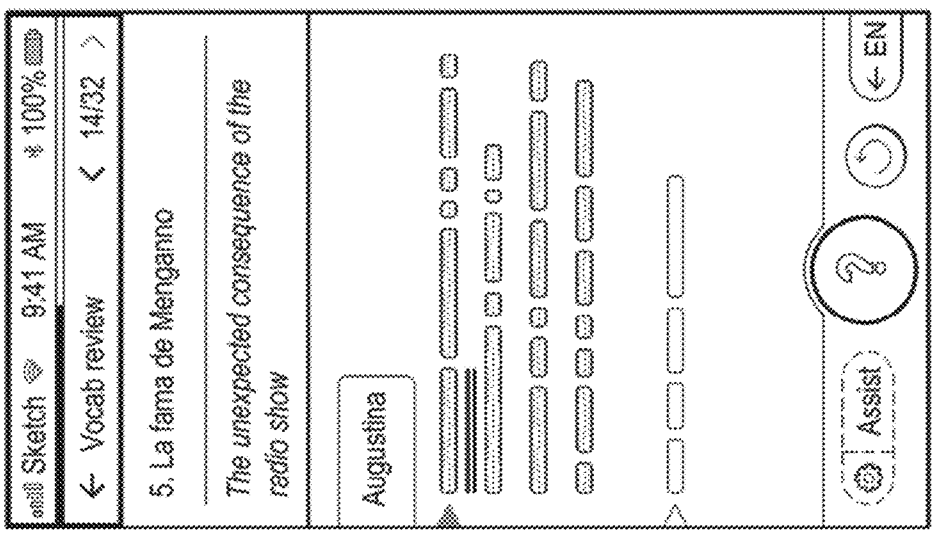
Figure 6C:
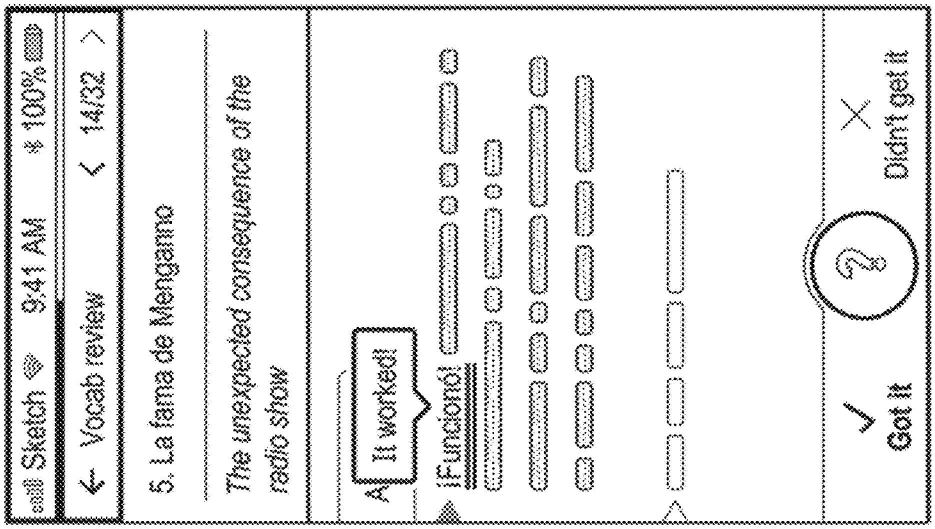

FIGS. 6A, 6B and 6C depict embodiments of visual interfaces illustrating how these vocabulary lists can work in an embodiment of the Jiveworld application. As an illustration, suppose a user has accumulated a vocabulary list in the manner described illustrated by FIGS. 5A, 5B, 5C for the story that they are studying. The selection of a "review vocabulary" mode by the user may result in the interfaces of FIGS. 6A, 6B, 6C. The user may then proceed one by one through their vocabulary list, in the same order as they appeared in the story. For each vocabulary entry the user may be presented with the sentence in which the vocabulary appeared. The users first concern is to recognize the spoken word (e.g., the double-underlined redacted word in FIGS. 6A and 6B) and second to understand the meaning. Since the example sentence presented in the interface is now disembodied somewhat from the chapter in which it appeared (e.g., its original context) embodiments of the interface can provide the relevant chapter title, passage hint, and even chapter summary to give the user extra context.

FIG. 6C depicts an embodiment of an interface that assists a user in revealing the vocab transcript and meaning, and grade themselves, either keeping the vocabulary in the list for further review, or dismissing it as learned. In this case the vocab word is "funcionó" (Spanish), meaning "it worked" in English. An assist mode may be provided here, in a vocabulary review context. The assist mode may, for example allow the user to unredact every word except for the vocabulary word.

After having marked the vocabulary as successfully recognized ("Got it") or not ("Didn't get it") as illustrated in FIG. 6C, the user may proceed to the next vocabulary item on their list.

Other embodiments of interfaces may also be used to assist in gaining listening fluency in embodiments of the Jiveworld application. One of these embodiments may be referred to as a visual focus indicator. As listening is done in real time, so the concept of "now" is important. The principle of serialized attention dictates that the user should never be reading one thing while listening to something else, so there is only one thing at a time that they are focused on. In other words, the visual presentation of the content and the auditory presentation of the content should be substantially synchronized, and kept synchronized.

In the visual display of content, the visual focus indicator may be represented with a contrasting effect. As discussed, a user may see the word currently being presented auditorily (or its redacted counterpart lozenge) highlighted (e.g., in a particular color such as teal blue) as depicted in the previous figures. In other words, the word (or lozenge) being highlighted in the visually presented transcript of the content is synchronized to the word simultaneously being presented auditorily in the auditory presentation. Extending the hierarchy of "now", embodiments may also have a pointer 110 (e.g., in a particular color such as teal) in the left margin indicating the current sentence, and the hint that applies to the current passage is at the top with a certain color background (e.g., teal or another color), as depicted in FIGS. 1A and 1B.

Even still, it is easy for a non-native listener to lose their way as the topic in conversation changes or evolves. Using an analogy from before, they fall off their semantic surfboard. Embodiments of interfaces presented by the Jiveworld system therefore give the user signposts (e.g., called "hints" or "passage hints") that can guide them through the auditory content, so they know roughly what to listen for. This is a type of listening assistance.

Figure 7:
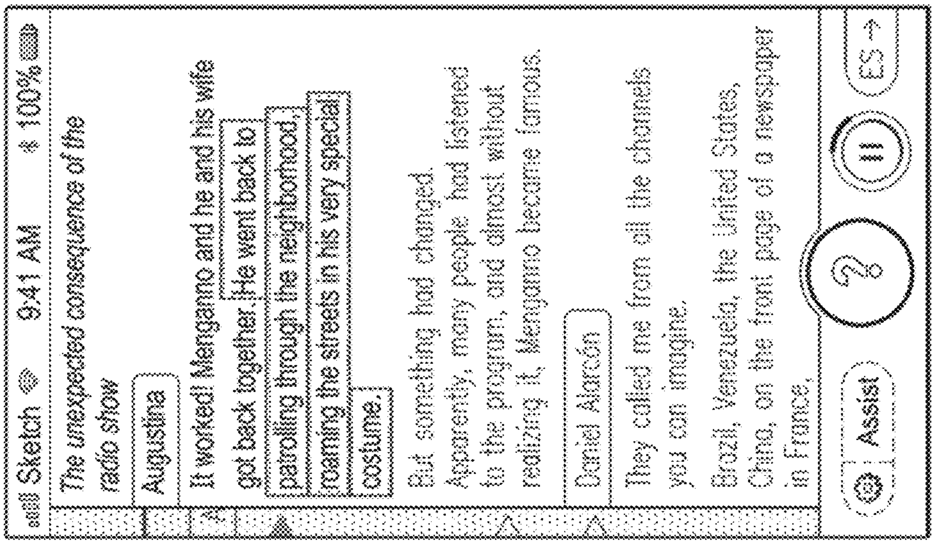
FIG. 7 is a depiction of an interface that may be utilized by embodiments of a language learning system.
Figure 8A:
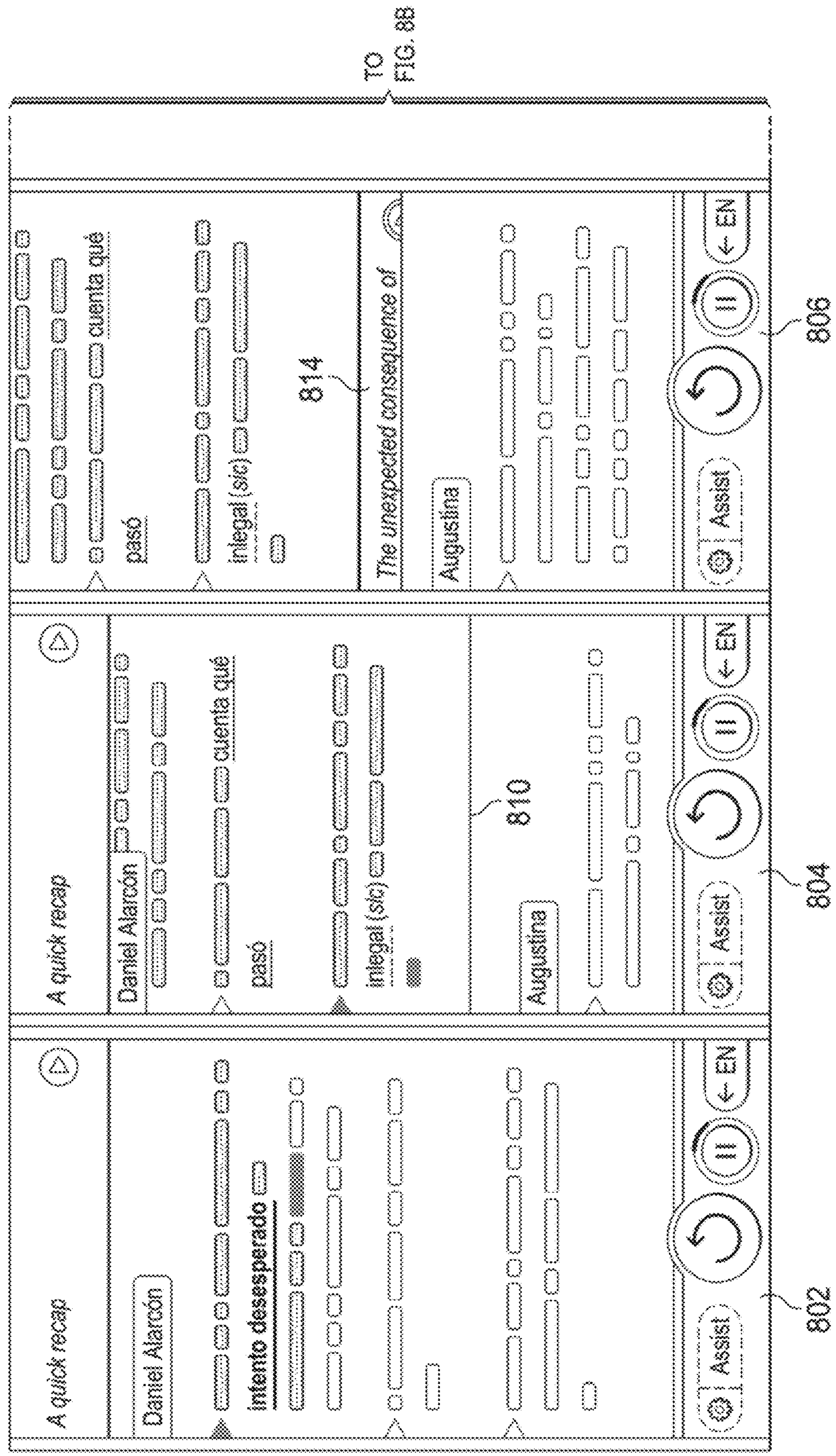
FIGS. 8A and 8B are a depiction of an interface that may be utilized by embodiments of a language learning system.
Figure 8B:
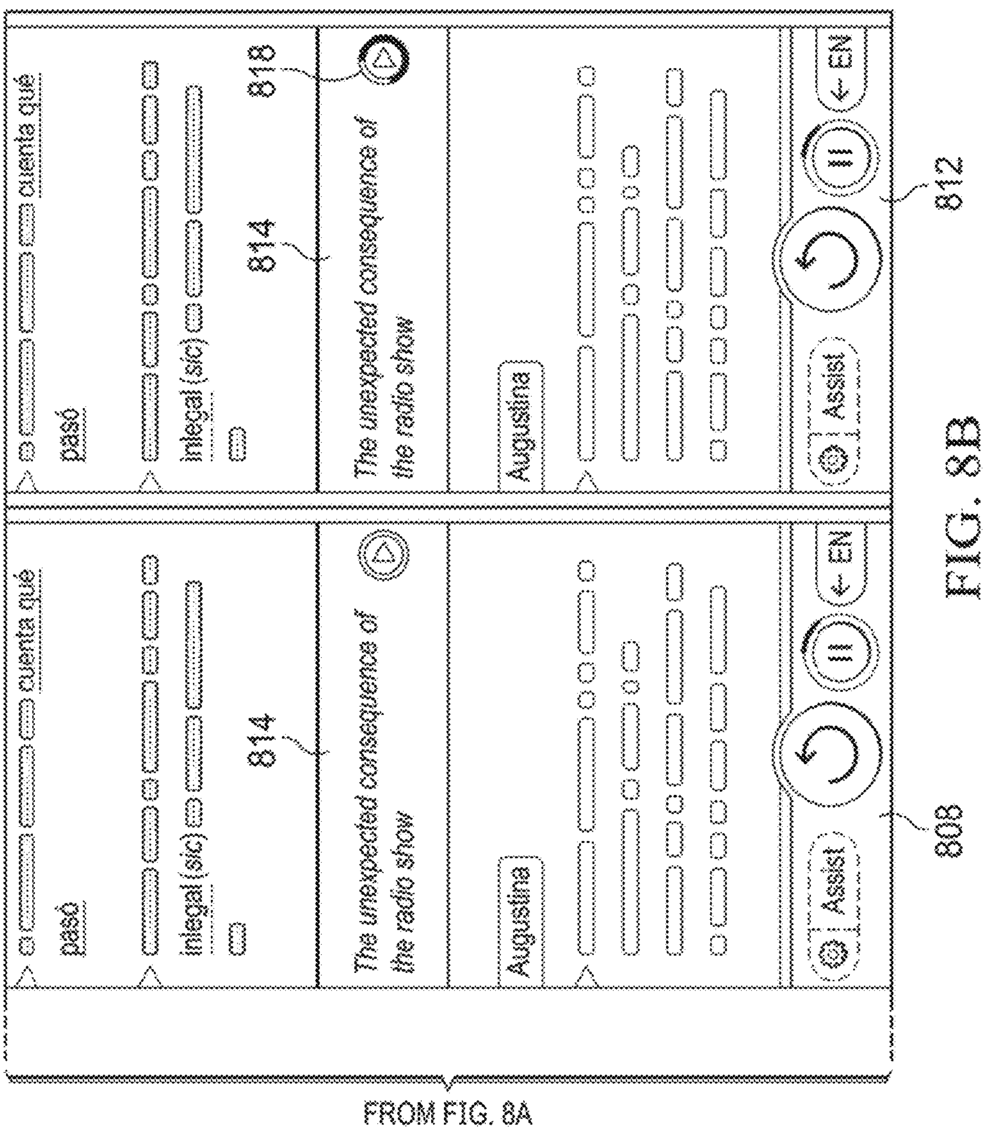

FIG. 7 shows an embodiment of a translation panel (e.g., that may slide in from the right of the visual display) that displays the current translated (e.g., in English or another native tongue of the user) sentence highlighted (e.g., in teal or another color). FIGS. 8A and 8B show a film strip depicting multiple states of one embodiment of an interface that illustrates how embodiments of the Jiveworld application can transition from one passage to another in the visual interface. An interface can start (left-most frame 802 of FIG. 8A) showing the current passage hint, "A quick recap"—the (e.g., colored such as teal) background shows that it applies to the audio that is currently being presented to the user.

In the second frame 804 of FIG. 8A, the presentation of content has reached the beginning of the next passage, indicated by a thin line 810 in the script (e.g., colored, such as teal). The next frames 806 (of FIG. 8A), 808 and 812 (of FIG. 8B) show the hint 814 revealing itself and remaining in focus, while the audio is paused a few seconds to allow the listener to read it: the longer the text of hint 814, the longer the time the audio presentation of the content may be paused. The play button 818 to the right of the new hint has a ring that animates clockwise, filling as a colored (e.g., black) line, to indicate the duration of the pause. The user can skip the pause by hitting the play button 818 at any time. In certain embodiments the hint may be narrated such that is presented audibly, either by a human narrator, or a text-to-speech automated system.

Figure 9:
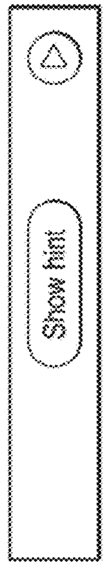
FIG. 9 is a depiction of a portion of an interface that may be utilized by embodiments of a language learning system.

In certain embodiments, as the visually presented transcript scrolls up, the interface may continuously present the hint 814 (e.g., "stick it" or "pin it") at the top of the screen (as in the first frame 802 of FIG. 8A) as long as it applies to the content currently being presented in the auditory presentation of the content. While embodiments may reveal hints 814 automatically as corresponding locations are reached in the audio presentation of the content, in other embodiments, a user can decide when or how such hints are displayed in the interface using an option in the "Assistance Preset" menu (e.g., as displayed in FIG. 3A). For example, a user may select to keep hints unrevealed until they choose to reveal the hint text. In this case, the interface may display an action button "Show hint" to reveal the hint (e.g., in place of where the hint text would show) as depicted in FIG. 9. The countdown for the pause may only begin if and when the user triggers the reveal action (e.g., using the "Show hint" button).

Other types of incremental help may be given to the user in other embodiments. For example, FIGS. 10A, 10B, 10C and 10D are embodiments of interfaces that show several types of inline assistance implemented in the visual interface. These include assistance comprising "incorrect usage" (or "SIC"), vocabulary, tricky bits, or biographies.

In embodiments of these types of interface, some words or groups of words in the visually presented transcript may have a solid underline indicating that they can be touched or clicked to reveal some useful information. For example, the interface of FIG. 10A shows a word "inlegal" 1002 in a particular differentiating color (e.g., orange or another color), to point out an incorrect usage by the speaker in the auditory presentation of the content. In this case the speaker meant to say the Spanish word "ilegal" (e.g., as noted in the slide-up panel 1004).

Figure 10B:
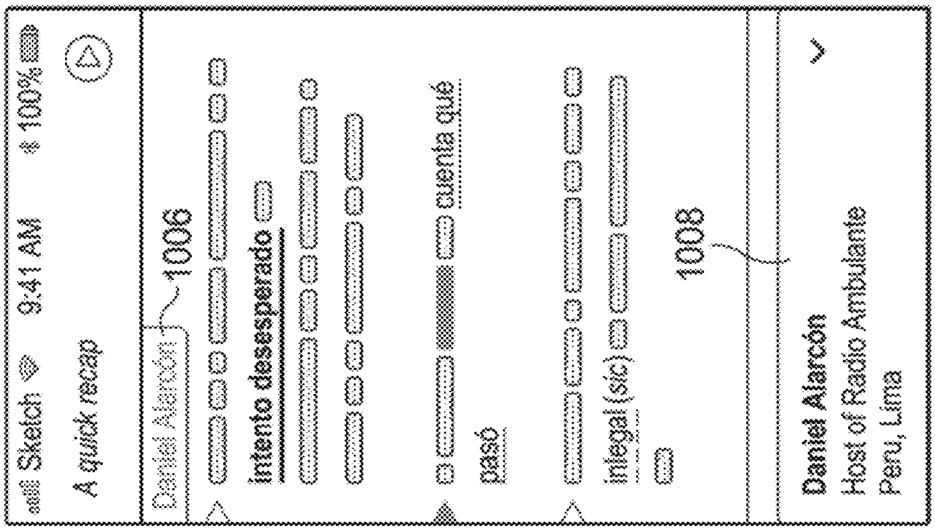
FIGS. 10A, 10B, 10C and 10D are depictions of interfaces that may be utilized by embodiments of a language learning system.
Figure 10A:
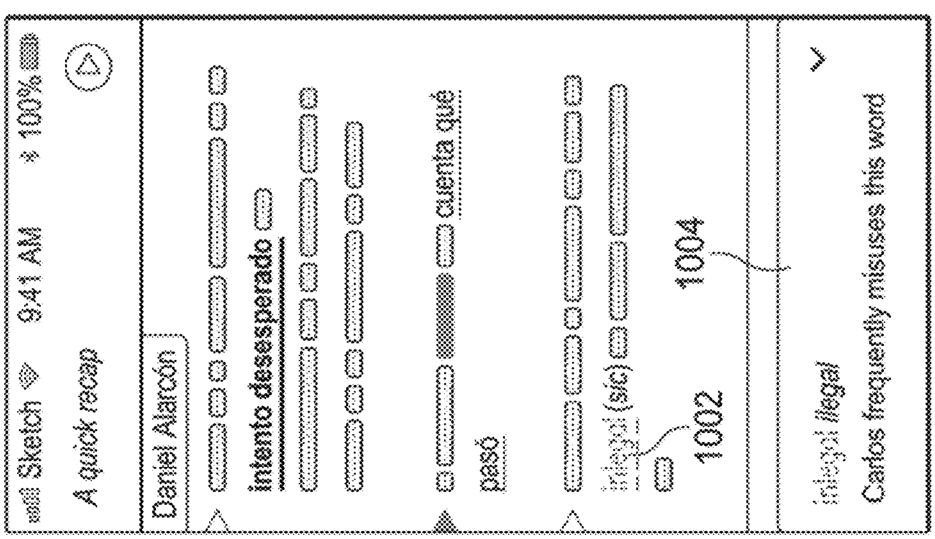

The interface of FIG. 10B shows that a speaker label 1006, "Daniel Alarcón" at the top in a particular color (e.g., blue), has been selected to show a short biography describing that speaker's role in the content and other pertinent information (e.g., their origin which may help in distinguishing between local accents and styles of speaking), in case the listener gets confused between the different speakers of the auditory presentation of the content. This speakers biography may appear in the biography panel 1008 at the bottom of the interface based on an interaction with this speaker label.

Figure 10D:
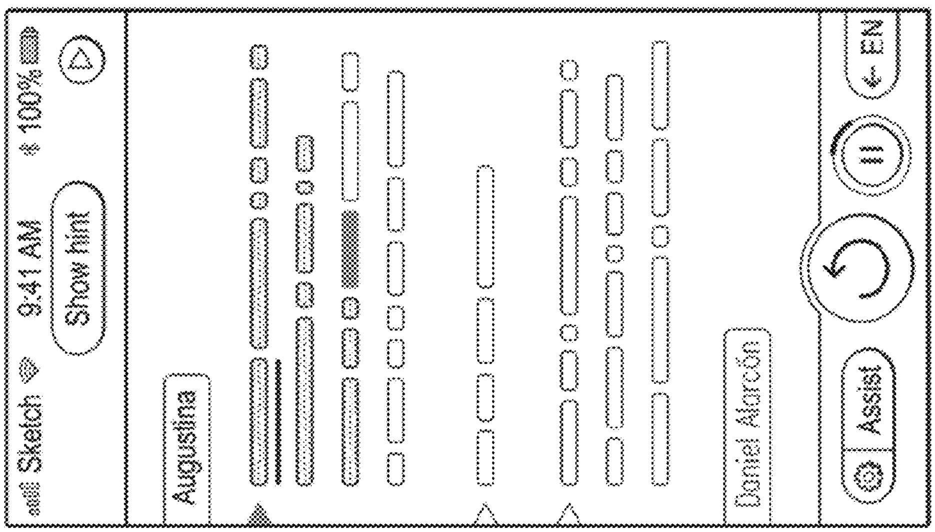
Figure 10C:
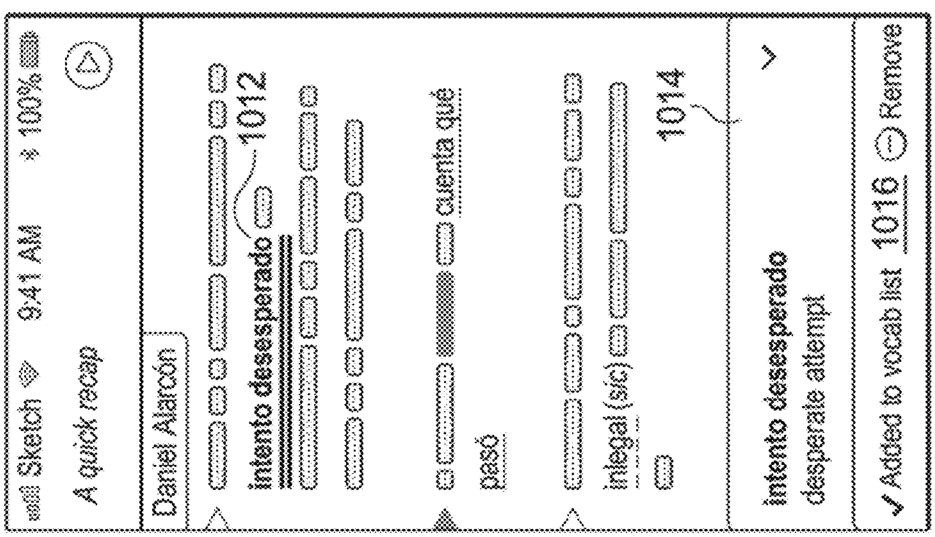

The interface of FIG. 10C shows two words 1012 (e.g., here "intent desesperado" in a particular differentiating color (e.g., green or another color)), indicating that this is vocabulary that the learner may not be familiar with.

Information on this vocabulary may appear in the vocabulary panel 1014 at the bottom of the interface based on an interaction with this differentiated word group 1012. Since one objective of the Jiveworld system is to help increase the user's passive vocabulary, the interface (e.g., in panel 1014) may provide a way for users to add vocabulary to a study list, such as button 1016. Moreover, such help may be provided even in the case where a vocabulary word (or other type of word group) is redacted. FIG. 10D depicts one embodiment of an interface of displaying redacted vocabulary that a user would touch or click (e.g. once) to unredact, and a second time to view the definition in the slide-up panel.

Additionally, consistent with the approach to "serialized attention" interfaces of the Jiveworld system may pause the audio when displaying this extra information (e.g., as displayed in panels 1004, 1008, 1014, etc.) so the user can read them without worrying about missing the main spoken content.

FIGS. 10A, 10B and 10C also show another kind of inline assistance indicated by a dotted underline (or other type of differentiator such as highlighting in a certain color or different type of underline) under "cuenta qué pasó". This differentiator may be an indicator of what is referred to as a "tricky bit" word group type and is something that the interface allows a user to optionally decide to display as unredacted independent of the rest of the visually presented transcript (e.g., using an option in the "Assistance Preset" menu such as that displayed in FIG. 3A). The "tricky bits" word group type are groups of words that are spoken in a way that might be difficult for a non-native (or even a native) listener of the language to discern. For example they might be mumbled, or heavily accented, or just spoken unusually fast in the auditory transcript. As such, the Jiveworld system may allow a user to decide to select (e.g., as part of the Assistance Preset menu as discussed), whether to show the word groups associated with vocab, notes, tricky bits or others as redacted or unredacted by default. In other embodiments, the tricky bit might have an attached language note which can be signified, for example, by a solid (rather than dotted) underline, which when tapped by the user may display the language note in a slide-up panel similar to 1004, 1008, 1014, etc.

Embodiments of the Jiveworld system may provide particular assistance in review and training in the target language. As discussed, a key element of training is repetition. The brain learns by recognizing patterns and so it needs to be stimulated with the same or similar signals without too much time elapsing. A lot of flashcard programs are now based on spaced repetition systems (SRSs) where the purpose is to try and make the brain recall something just at the point where it is about to forget it.

SRS works well for isolated data—e.g. vocab lists—but for a more complex piece, like a 100-250 second portion of audio listening, a different more effective technique may be employed by embodiments: listen once to study carefully, followed by a second review pass as reinforcement, while the content is relatively fresh in the user's mind.

It is expected by design, that the user will struggle somewhat in the first pass listening to a language they've not mastered, but the second pass of the same content will feel more like listening to a native language. Not only is this a pleasurable experience, like freewheeling down a hill that has just been cycled up, but the brain is listening in a different mode—a fluent mode where the meaning is coalescing naturally in real time.

Figure 11A:
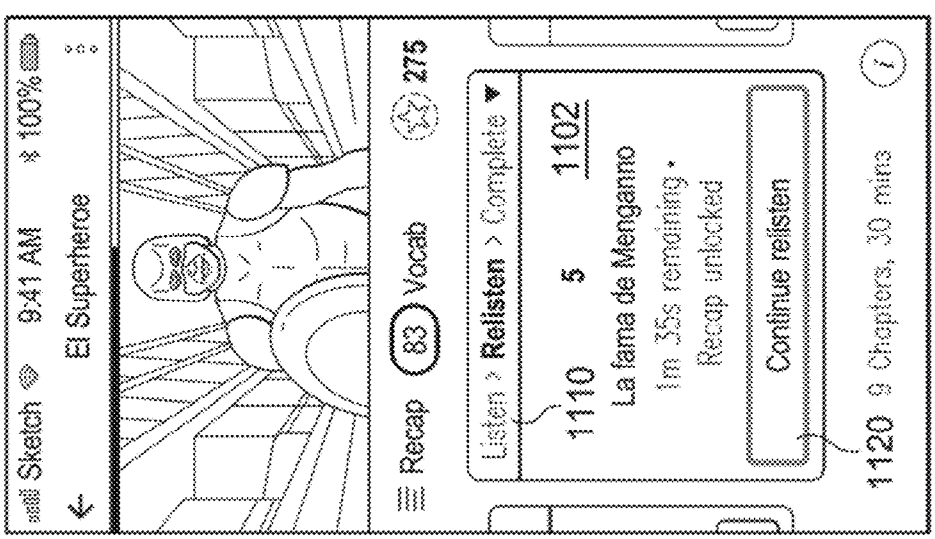
FIGS. 11A, 11B and 11C are depictions of interfaces that may be utilized by embodiments of a language learning system.
Figure 11B:
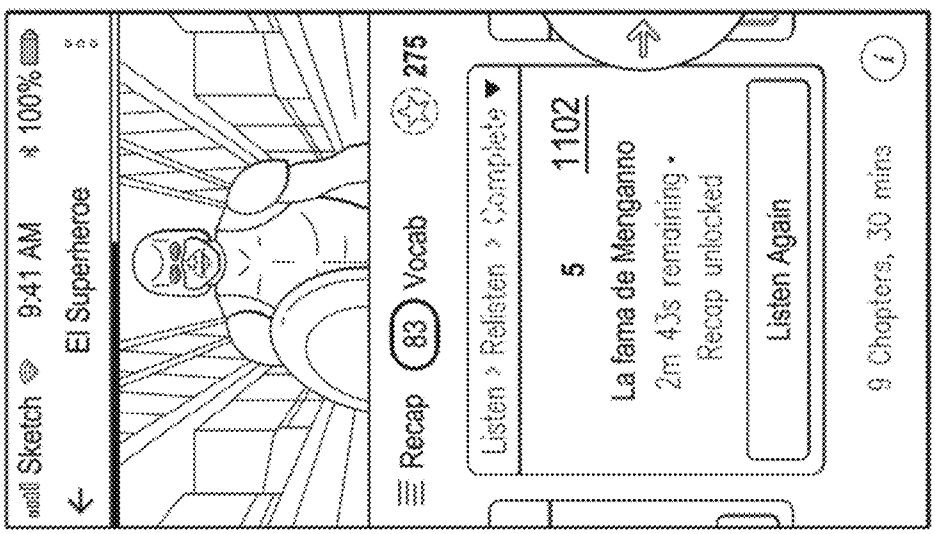

FIGS. 11A and 11B depict embodiments of visual interface that may be utilized in such a review process. In this case, audio content (e.g., longer than a certain threshold length), which may be referred to as an episode, is broken up into multiple chapters of a desired time length (also referred to as a chapter) that are represented in a (e.g., horizontal) card carousel. In the example depicted in the interface, a card 1102 for chapter five is depicted. In embodiments of the Jiveworld system, when a user hits an action button (e.g., one of Listen or Relisten option on the menu 1110) a card may expand to occupy the full screen, becoming the player for the chapter including the corresponding visually presented transcript of the chapter of content, as shown in the FIGURES above. After the interaction with the chapter (e.g., the audio portion of the transcript has completed), the player shrinks down to become the chapter card again.

The "breadcrumb" at the top of the card—(e.g., the portion 1110 of the interface) that presents the "Listen-> Relisten-> Complete" menu guides the user through each pass. By default the first "listen" pass will have assistance on (e.g., the Assist button will be activated as shown in FIG. 3C) in the player, and the second "relisten" pass will not. The (e.g., colored teal) button 1120 at the bottom of the card 1102 in FIG. 11A indicates that the chapter carousel card depicted is still the current chapter, and the user can see that next chapter card, whose edge is visible to the right of card 1102 is greyed out. The user can still indicate to progress to (e.g., swipe or other indication) the next chapter, but they are encouraged to complete both listening passes on the current card 1102.

When the second "relisten" pass is complete, as shown in FIG. 11B, the interface "activates" (e.g., it is no longer presented in grey and can accept interactions) the card corresponding to the next sequential chapter (e.g., the card to the right), however the user is still kept on the current card 1102 in case they want to listen to the chapter associated with that card 1102 for a third (or fourth etc.) time. This embodiment of an interface is an example of how the Jiveworld system can guide the user into a flow and habit that should improve their retention and progress while still giving them flexibility.

Figure 11C:
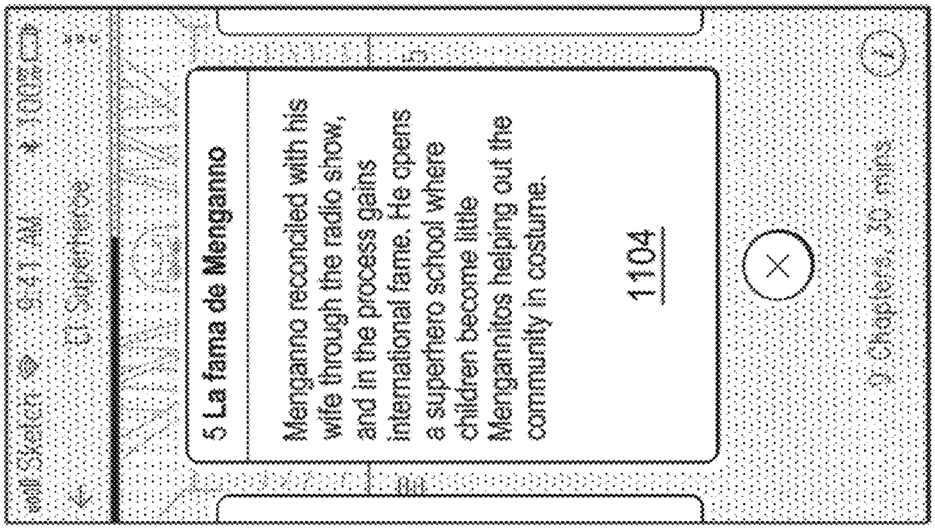

FIG. 11C shows another feature of embodiment of an interface, the "chapter summary" which can appear conceptually on the back of the chapter card 1102 and may be activated by interaction with the chapter card 1102 such that the chapter card "flips over" in the interface presenting the chapter summary 1104. This chapter summary 1104 is an editorial recap of the chapter on the corresponding chapter card 1102 which may be, by default, only enabled after the first complete listen of the chapter represented by the chapter card 1104. This acts like a safety net allowing the user to check their comprehension and revisit anything they missed or misunderstood. In other embodiments, instead of a chapter summary, the user may see a series of questions about the chapter content for the user to test their comprehension.

Figure 12A:
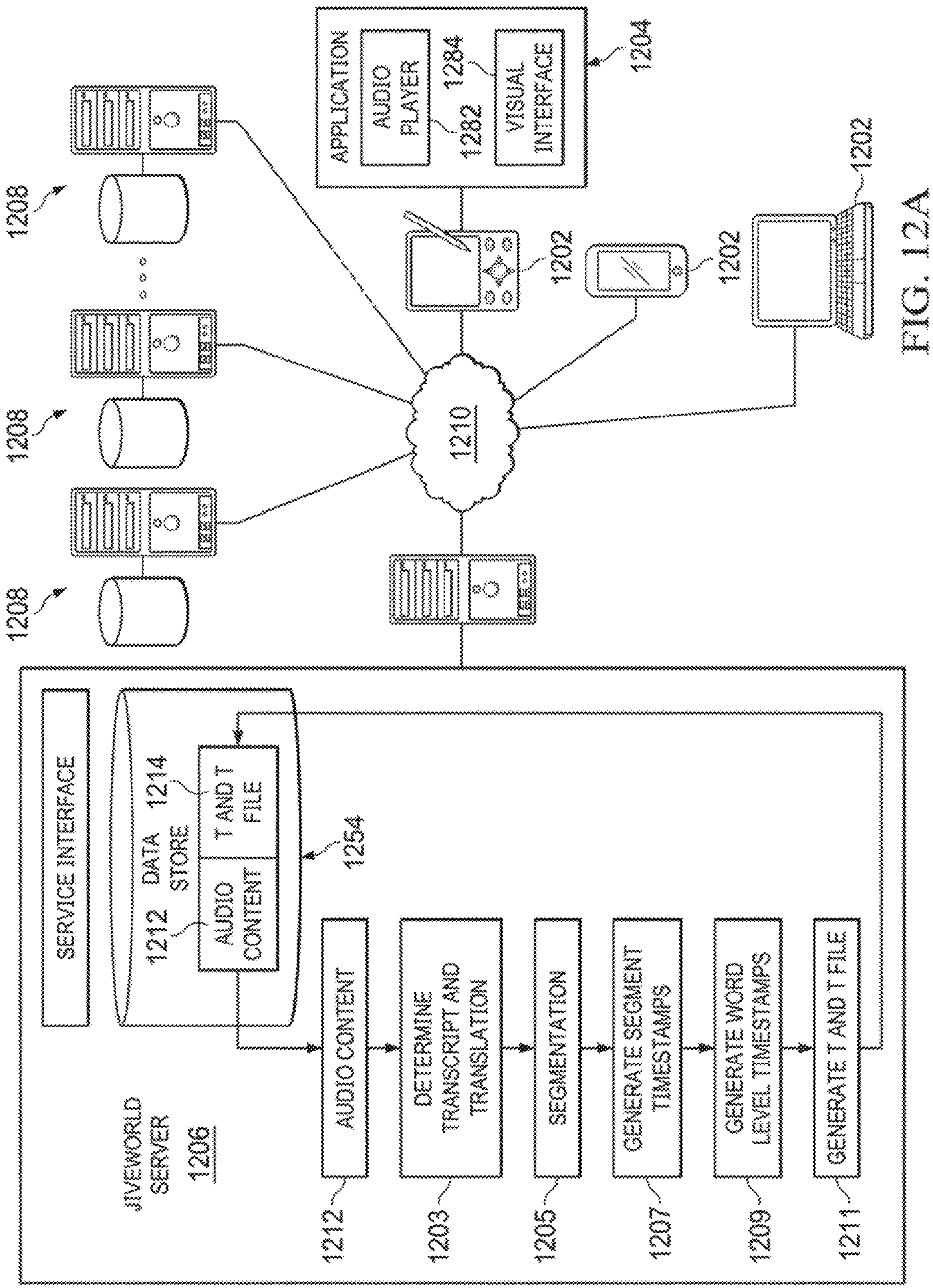
FIGS. 12A, 12B and 12C are block diagrams of embodiments of a language learning system.
Figure 12B:
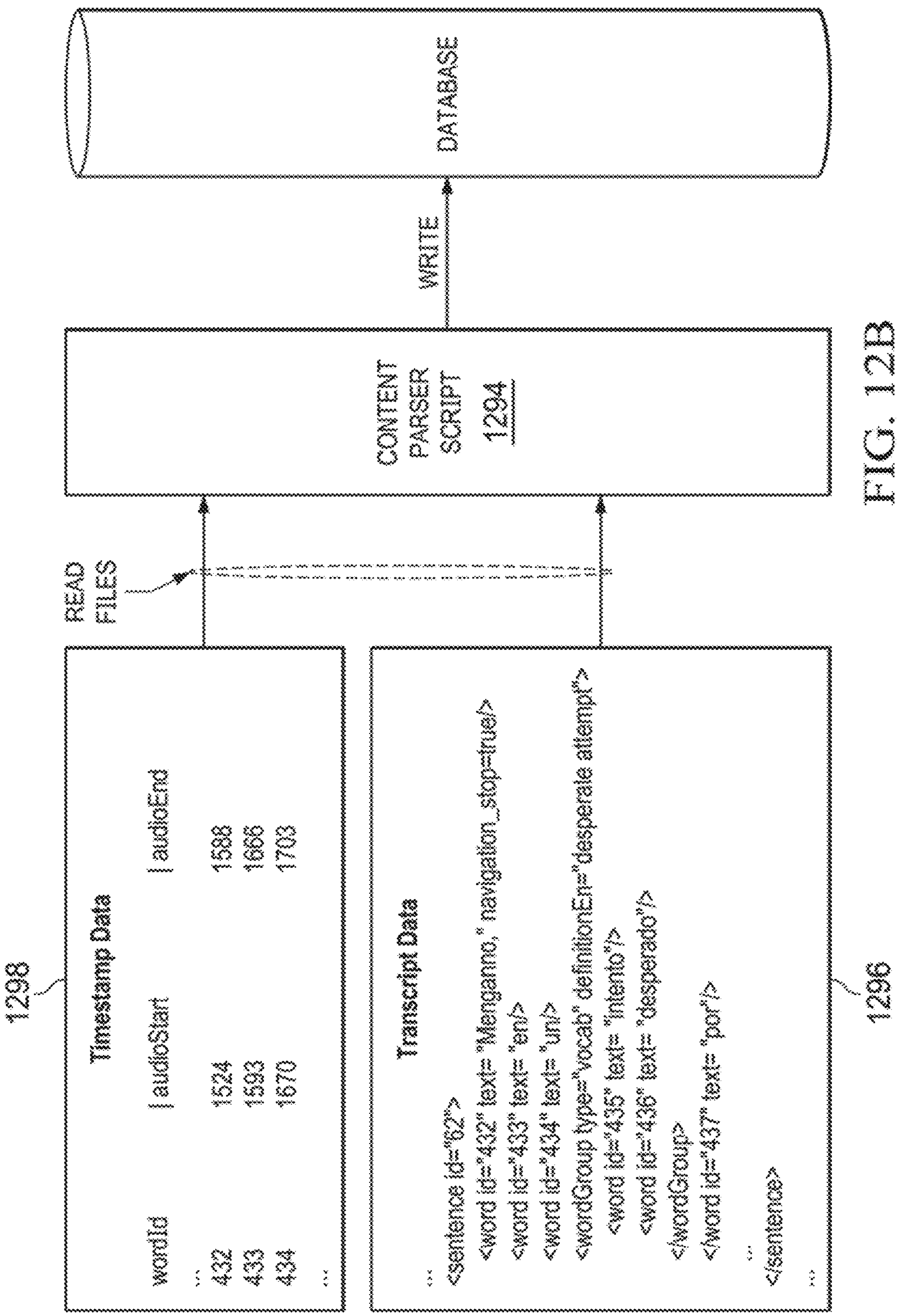
Figure 12C:
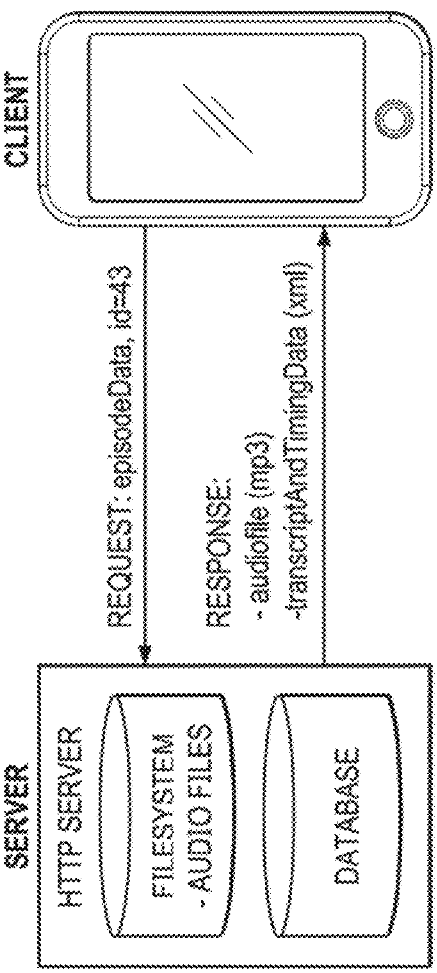

It may now be useful to delve into more detail about embodiments of implementations of the Jiveworld system. Referring then to FIGS. 12A, 12B and 12C, a depiction of embodiments of portions of an example implementation of the Jiveworld system are depicted. As shown in FIGS. 12A, in one embodiment the Jiveworld system may include one or more client devices 1202 running an application 1204 (e.g., referred to sometimes as the client, client application or Jiveworld application) and communicatively coupled to a Jiveworld server 1206 although, in other embodiments the Jiveworld application 1204, may be run on the client device 1202 as a standalone system. In these embodiments, all the data can be precompiled into the application 1204.

The Jiveworld server 1206 can access or otherwise obtain audio content 1212 from one or more content sources 1208 over network 1210 (which may be the Internet, an internet, an intranet, a WAN, a LAN, a wireless or cellular network, or another type of communication network). Such audio content 1212 may also be manually accessed at the Jiveworld server 1206 off of a non-transitory computer readable medium including such audio content 1212. This audio content 1212 (e.g., an mp3 or the like) may be stored in a data store 1254 at the Jiveworld server 1206 and a corresponding structured data file 1214 for the audio content 1212 created at the Jiveworld server 1206. This structured data file 1214 may include the text, timing, and word groups, as well as the timestamp or duration for each word spoken in the corresponding audio content 1212, where each word (associated with a timestamp or duration) is indexed (e.g., by the timestamp) into an associated spot in the corresponding audio file 1212 where the word is spoken. This structured data file 1214 can be, for example, an eXtensible Markup Language (XML) or JavaScript Object Notation (JSON)) file, and may be referred to as the transcript and timing (or T&T) file.

FIG. 12B illustrates embodiments of two inputs that may be utilized to create the transcript and timing file 1214. The timestamp data 1298 may designate the beginning and end of segments or time sequences of corresponding audio content in the audio file 1212. A segment may be a short portion of the audio content of the audio file 1212—typically 2-4 seconds of audio—that is spoken at a fairly consistent speed. A segment is sometimes a full sentence, but is often just part of a sentence, and occasionally a single word. By finding the start and end of each segment, it is possible for the Jiveworld system to display the transcript word-by-word as the user hears it. This is because once the start and end time of a segment is determined, an approximation can be made by the Jiveworld system of the start and end timestamp of each word by analyzing its length (letters, vowels, syllables) compared to the other words in the segment. The words can be weighted accordingly (e.g., using linear interpolation or the like). This timestamping of each word is stored in the timestamp data 1298.

This timestamp data 1298 may be an export option of many audio editing tools (such as Audacity or Hindenburg Pro) which allow named labels associated with time sequences or segments to be created in an audio source file. Timestamping can also be done automatically by speech recognition processing services like Google Cloud Speech-to-Text service (e.g., or another algorithm or service). The output of such an editing tool or service may be a plain text file (typically comma or tab separated) which lists the label name with the start and end point in milliseconds in the audio track.

The timestamp data 1298 (including the data on the segments) may be used to implement another type of assistance for the learner (e.g., by augmenting or altering the timestamp data). This is referred to in the Jiveworld system as audio kerning. "Kerning" is a term used in typesetting, referring to the horizontal space between one letter and the next in a word. 'Tight' kerning means that the letters are more squashed together; 'Loose' kerning stretches them further apart.

Embodiments of the Jiveworld system may thus implement audio kerning by artificially increasing the natural pauses between sentences or sentence segments—(e.g., by programmatically stopping and start the audio player) to help give the listener more thinking time to parse the sentences. This audio kerning may be independent of any "audio time stretching" (which will slow everything down without changing pitch). The Jiveworld system can, for example, add a 500 ms pause after each segment (e.g., in the timestamp data), or adjust the gap so that it is never less than 1000 ms. This audio kerning may be particularly helpful when listening to long sentences with more complex structures, where it is easy for a user to lose their place as a non-native listener. Since audio kerning does not change the speed of individual words on the track, the user may still be listening to the natural sound of the language.

Once the timestamp data 1298 is created, the timestamp data 1298 can then be combined with transcript data 1296 (e.g., and translation data, and other data) for the corresponding audio file 1212 to produce a separate file (e.g., which may also be a text file). This file can be created by compiling the transcript of the audio content into a structured text file which organizes the transcript of the audio content into a hierarchy of, for example, passages, paragraphs, sentences, and words.

Identifiers of each type of word groups (vocab, tricky bits etc. mentioned above) associated with a particular word or set of words may also be identified in the transcript data 1296.

As one example, this structured data may be encoded as XML in the following way:

```
<sentence id="62">
  <word id="432" text= "Menganno," navigation_stop=true/>
  <word id="433" text= "en"/>
  <word id="434" text= "un"/>
  <wordGroup type="vocab" definitionEn="desperate attempt">
    <word id="435" text= "intento"/>
    <word id="436" text= "desperado"/>
  </wordGroup>
  <word id="437" text= "por"/>
  ...
</sentence>
```

In this example the two words "intento" and "desperado" (in Spanish) are selected as vocab with the translation "desperate attempt" in English. Parsing these two files and combining the timing data with the semantic data can be achieved with a script or other set of instructions 1294 (e.g., referred to as the "content parser script") written in a language like Ruby or Python or another programming language. The resulting T&T file 1214 can then be written into the data store 1254 of the Jiveworld server 1206 in association with the corresponding audio content 1212.

It may be useful now to describe one particular embodiment of the creation of a T&T file 1214 in more detail. With reference to FIG. 12A, once the audio content 1212 is obtained, the Jiveworld server 1206 can determine a corresponding transcript for the audio content 1212 (e.g., the words in the target language being spoken in the audio content 1212) and a corresponding translation for the audio content 1212 (e.g., a translation of the audio content in one or more native language of potential users of the Jiveworld system) (STEP 1203).

The obtained transcript may be edited into a "verbatim" or annotated transcript where pauses, half word, hesitations, stutters or other spoken language artifacts or utterance are annotated within the transcript. The transcript may also be annotated with a note of the speaker of each portion (e.g., sentence, paragraph or other syntactically or semantically meaningful portion) of the transcript. For example, the audio content 1212 may be an interview or a radio play or the like. In such instances, the speaker or character, etc. speaking each portion of the transcript in the corresponding audio content 1212 may be noted in the transcript. These annotations may be done, for example, using a specialized markup language intended for such annotations.

This verbatim transcript can then be broken up into segments in "segmentation" process (STEP 1205). Segmentation means breaking up the verbatim transcript into portions such as those defined by free flowing runs of words (e.g., that may be spoken at an even pace). Each segment may be a run of words without a pause of a quarter of second or more in the audio content 1212 and may be based on annotations in verbatim transcript. As discussed, these segments may be a short portion of the audio content of the audio file 1212— typically 2-4 seconds of audio—that is spoken in the audio content 1212 in a fairly consistent speed. A segment is sometimes a full sentence, but may be just part of a sentence, and occasionally a single word. Each segment is thus identified with an identifier while each word of the segment may also be assigned an identifier. In one embodiment, each type of word group of interest may also be identified. Each of the word groups identified may be assigned an identifier associated with the specific type of word group (e.g., identifiers for "vocab", "incorrect usage", "tricky bits" or "annotations").

Additionally, the Jiveworld server can structure the content into chapters (e.g., and chapters into passages) and associate names with the chapters. The term chapter as used herein will refer to portions of the content being presented (e.g., and not chapters as are traditionally used when referring to printed or audio materials such as books or the like). This content (e.g., both the audio and the corresponding transcript or translation) may be portioned into digestible chapters (e.g., around 2-4 minutes of audio content or change in subject). While certain embodiments may not portion the content into chapters, in some embodiments it is desirable to portion the content into chapters to discretize the content so that a user can have a digestible amount of content. It has been found that the use of naturally spoken content, (e.g., interviews, radio programs, plays or other dramas with characters reading parts, etc.) is desirable for learning a spoken language (e.g., as opposed to audio books or the like) as listening to such naturally spoken language may aid a learner in actually learning to understand that language as spoken. Much of this naturally spoken content may thus not have natural divisions. Accordingly, in some embodiments, this content is portioned into chapters to allow a user to focus on each chapter in a discrete manner. to discretize the content so that a user can have a digestible Each of the segments in the verbatim transcript may be then be associated with a "start of segment timestamp" that denotes the start time of that segment (e.g., relative to the beginning of the audio content 1212) and an "end of segment timestamp" that denotes an end time of that segment in the corresponding audio content 1212 (e.g., relative to the beginning of the audio content 1212) (STEP 1207). These segment timestamps may be stored in a timestamp data file and indexed according to the identifiers of their corresponding segment in the verbatim transcript.

Figure 12D:
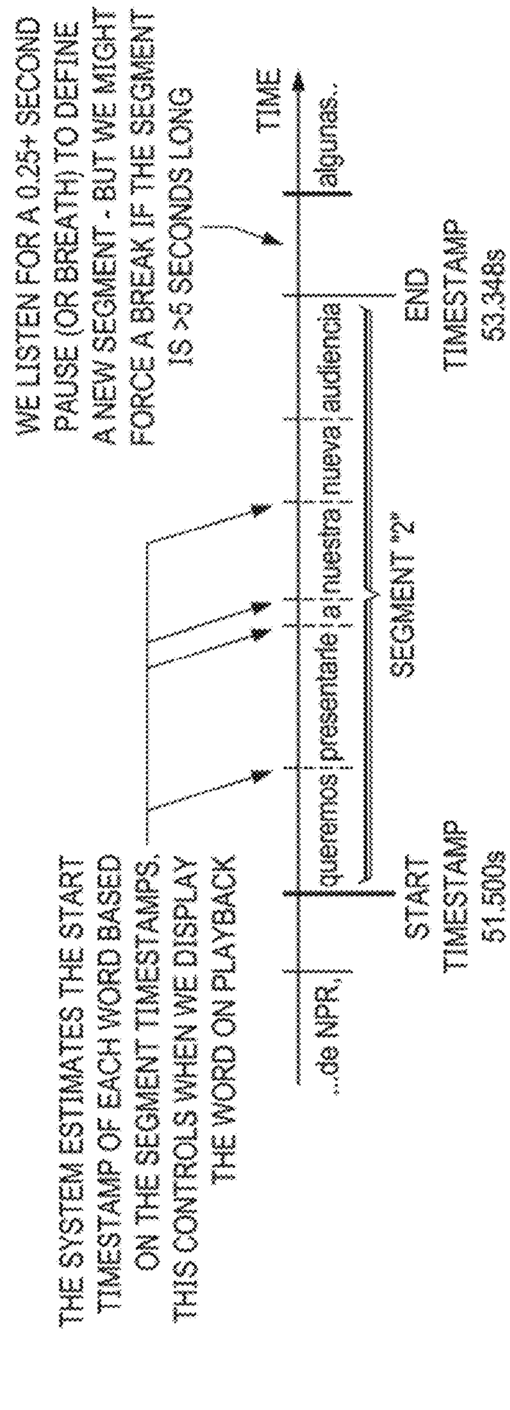
FIG. 12D is a diagram depicting one embodiment of a segmentation process.

Based on the timestamps assigned to the start and end of each segment, the timestamps for each word within each segment can then be determined (STEP 1209) and stored in the timestamp data file along with identifiers in the transcripts for each of those words. Word level timestamps for each word of each segment can then be determined based on the start of segment timestamp and the end of segment timestamp for a segment. These word level timestamps may include the start time and the end time of each word within the segment (e.g., and thus within the transcript). These word level timestamps include for example, a timestamp denoting the start of each word (e.g., relative to the audio file 1212) and, in some embodiments a timestamp denoting the end of the word. FIG. 12D depicts a representation of one embodiment of the segmentation and timestamping process.

In one embodiment, the determination of the start time and the end time of each word within the segment may be extrapolated using linear interpolation based on the start of segment timestamp and the end of segment timestamp for the segment and the length of each word within the segment (e.g., each word within the segment is given a relative weight based on the length of the word, and, in some embodiments, the number or total length of words within the segment or other criteria). This relative weight can be used to apportion the time between the start of segment timestamp and the end of segment timestamp for the segment to each word. These word level timestamps may be stored in a timestamp data file and indexed according to the identifiers of their corresponding words of the segment in the verbatim transcript. This word level granularity of timestamps serves to facilitate the synchronization of the presentation of the audio content and the corresponding visual presentation of content.

Once the segments and word level timestamps and the identification of word groups within each segment and other metadata have been determined, this transcript data and timestamp data may be merged along with the translation of the content into the T&T file 1214 (STEP 1211).

Figure 12F:
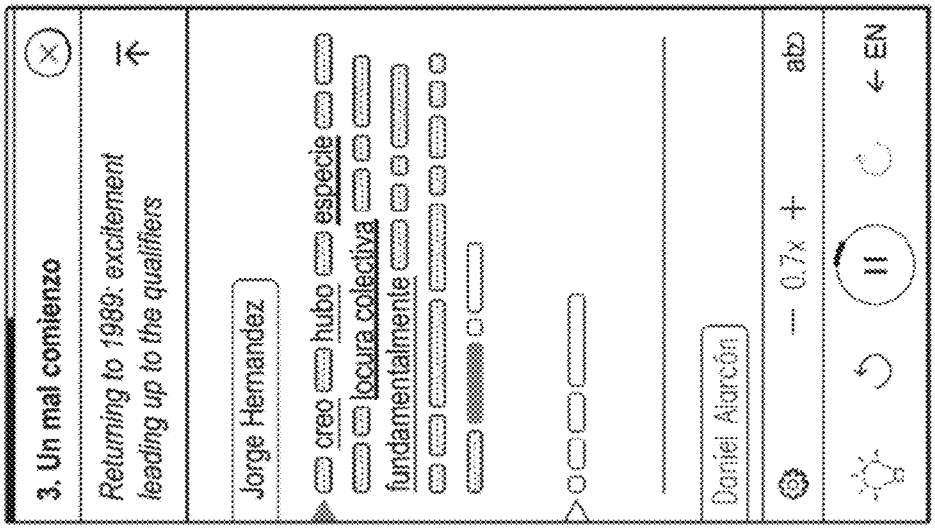
FIGS. 12E and 12F are example interfaces that may be utilized by embodiments of a language learning system.
Figure 12E:
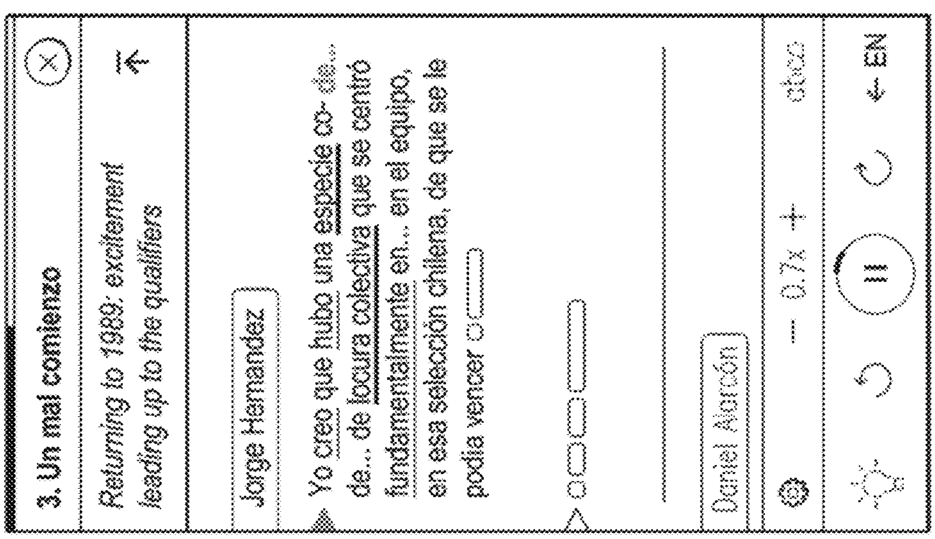

It may be useful at this point to depict an example of the generation of the T&T file for an audio file. Looking then at FIGS. 12E and 12F, embodiments of an interface for the Jiveworld application that present an unredacted transcript of a portion of audio content (FIG. 12E) and a corresponding partially redacted portion of the same audio content (FIG. 12F) are depicted.

An example annotated transcript for this audio content may be as follows:

#Un mal comienzo

> A Bad Start

Returning to 1989: excitement leading up to the qualifiers @Daniel Alarcón

[99] Volvamos a las eliminatorias.

> Let's get back to the qualifying rounds.

[100] La<expectativa=expectation> era gigante.

> The expectation was enormous.

@Jorge Hevia

[101] Yo<~creo> que+

[101.1]<~hubo> una <especie=kind, type> co-- de . . . de . . . de <locura colectiva=shared madness>

[101.2] que se centró <~fundamentalmente> en . . . en el equipo, en esa selección chilena,

[101.3] de que se le podia vencer a Brasil.

> I think there was a kind li-- of . . . of . . . of shared madness that fundamentally centered on . . . on the team, the Chilean National Team that could defeat Brazil.

[102] Y eso era historia.

> And that would be historic.

While the corresponding timestamp data for this annotated transcript may be as follows, where the three columns are the: segmentStartTimestamp: milliseconds, the segmentEndTimestamp: milliseconds and the segmentLabel: String, where the segmentLabel corresponds to the label in the square brackets in the annotated transcript:

443.929 445.355 99
445.429 446.716 100
447.094 447.977 101
448.575 450.884 101.1
451.307 454.389 101.2
454.757 456.339 101.3
456.900 457.553 102

The T&T file for the associated audio file that results for the merging of these files is depicted in the Appendix A below.

Referring to FIGS. 12A and 12C, one embodiment of the requesting and obtaining audio content and the associated T&T file for the audio content is depicted. Here, the client application 1204 on the client device 1202 may request a particular piece of content or chapter thereof from an interface (e.g., a service interface) of the Jiveworld server 1206 and store this content at the device 1202. Again, there may be two files that may be obtained from the server 1206 by the client application 1204, an audio file 1212 (e.g., mp3 or the like) of the content that will be auditorily presented and a T&T file 1214 including structured data file including transcript and timing data comprising the text, timing, and word groups of the audio content, as well as the timestamp and duration for each word that is index (e.g., by time) into an associated spot in the corresponding audio file.

At the client side application 1204, parsing the structured transcript and timing data and generating the text layout in the interface of the application 1204 may be done using a standard depth-first tree iterator. The styling of visual components may be altered during playback or otherwise through dynamic properties, so for example changing the color of a word element in the layout when the audio player is at a point that corresponds to its start time and duration in the timing data is straightforward.

The technique for modifying the properties of a user interface element by changing the property of a variable is known as "data-binding" is supported by most modern UI frameworks including React JS, React Native, Angular JS or the like. The rendering of the redacted text versus the unredacted text may be accomplished by rendering each word in its own layout component that calculates the minimal boundaries around that word—the bounding box in FIG. 13. This ability is provided by most modern UI libraries on the Internet (or world wide web) (e.g., HTML or other markup language) and mobile devices.

Figure 13:
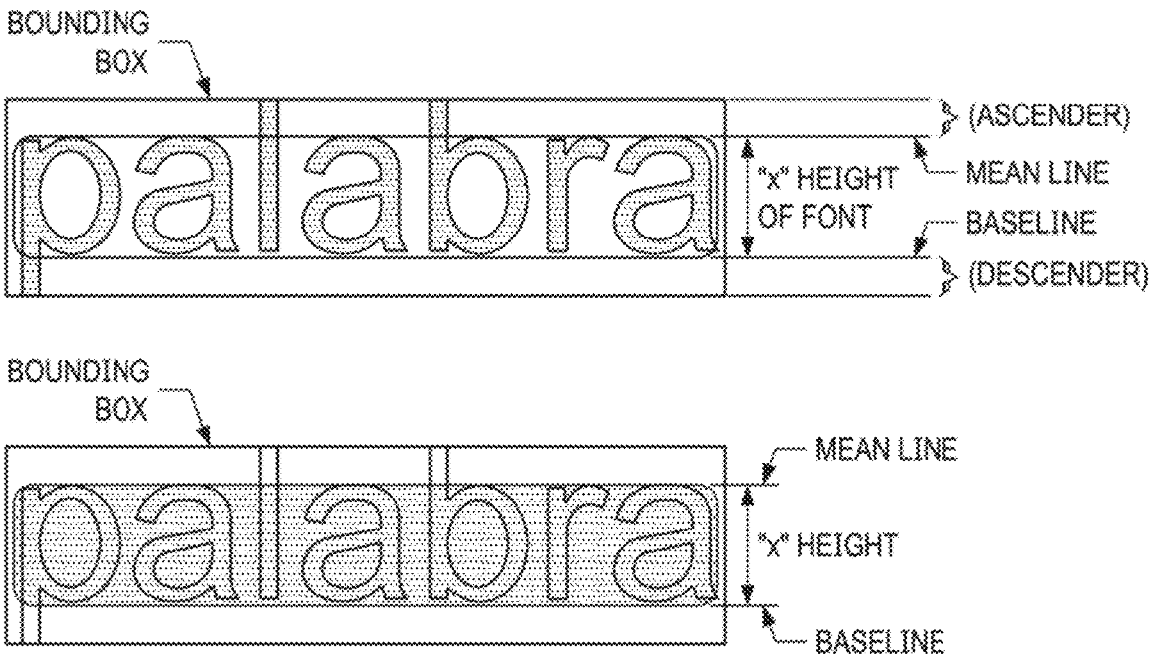
FIGS. 13, 14A and 14B are diagrams depicting the construction of a lozenge.

Accordingly, for an alphabetic font as illustrated in FIG. 13, embodiments may size a redaction lozenge by drawing a rounded rectangle inside, maximized to 100% of the width of the parent bounding box. For aesthetic reasons it may be desired to size the lozenge vertically to fit between the baseline and mean line of the font, the height of which is called the "x" height. For layout embodiments may be configured with these values (which can be determined for font or fonts chosen) to render the lozenge. Thereafter the client application can control whether the redaction lozenge or the text is visible by changing the opacity value of each, where zero opacity makes it invisible. Underlines can be drawn using the same basic technique.

Figure 14A:
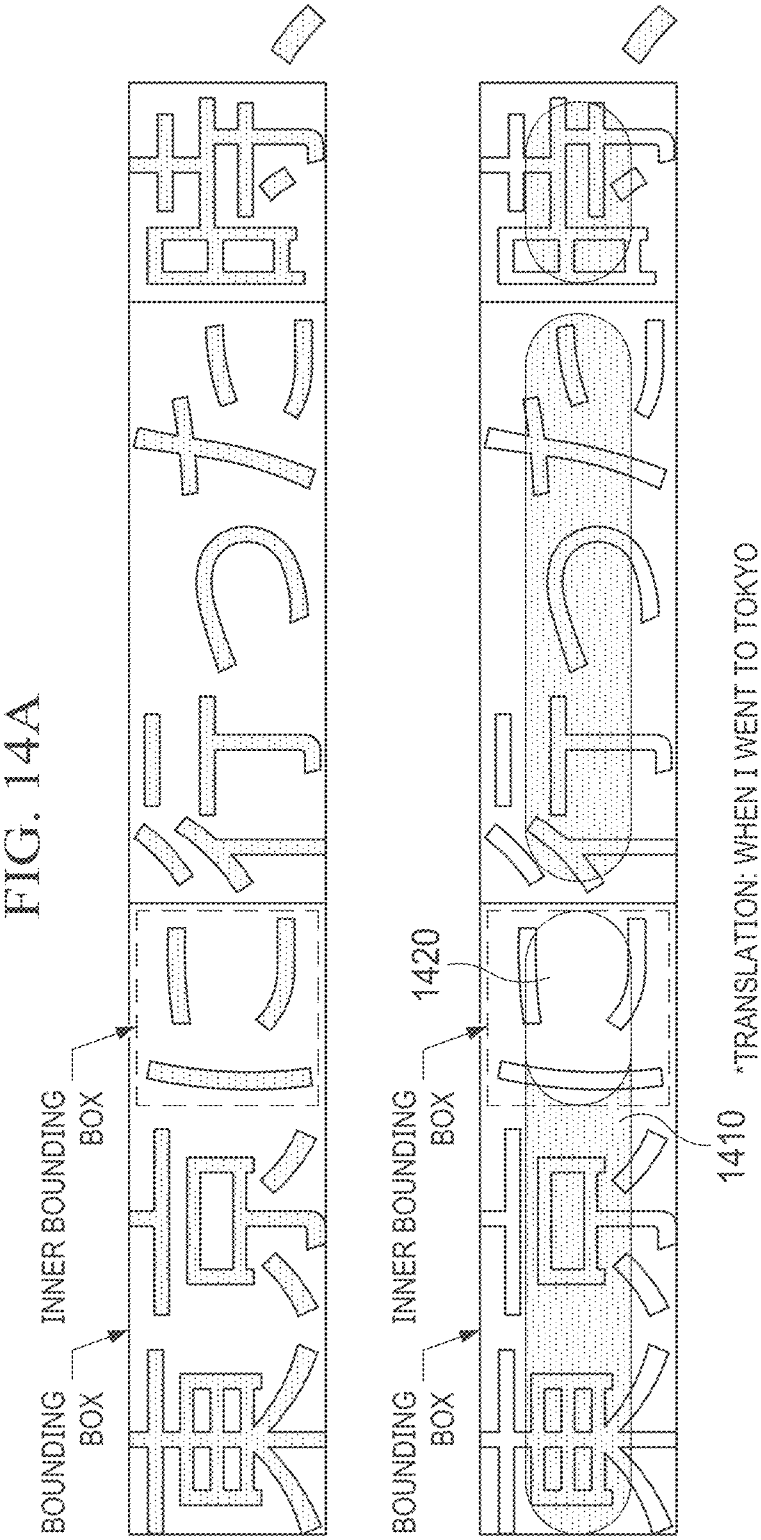

Similar techniques may be applied to other types of font or fonts for other types of languages. FIG. 14A depicts an embodiment as applied to Japanese which uses block characters. The structure of the language has nouns that are typically followed by "particles" or post-positions (equivalent to prepositions in English). Using a bounding box within a bounding box we can create structured redaction. The first (dark) lozenge 1410 covering three characters contains an inner white lozenge 1420 for the third character indicating a particle attached to the preceding noun.

Figure 14B:
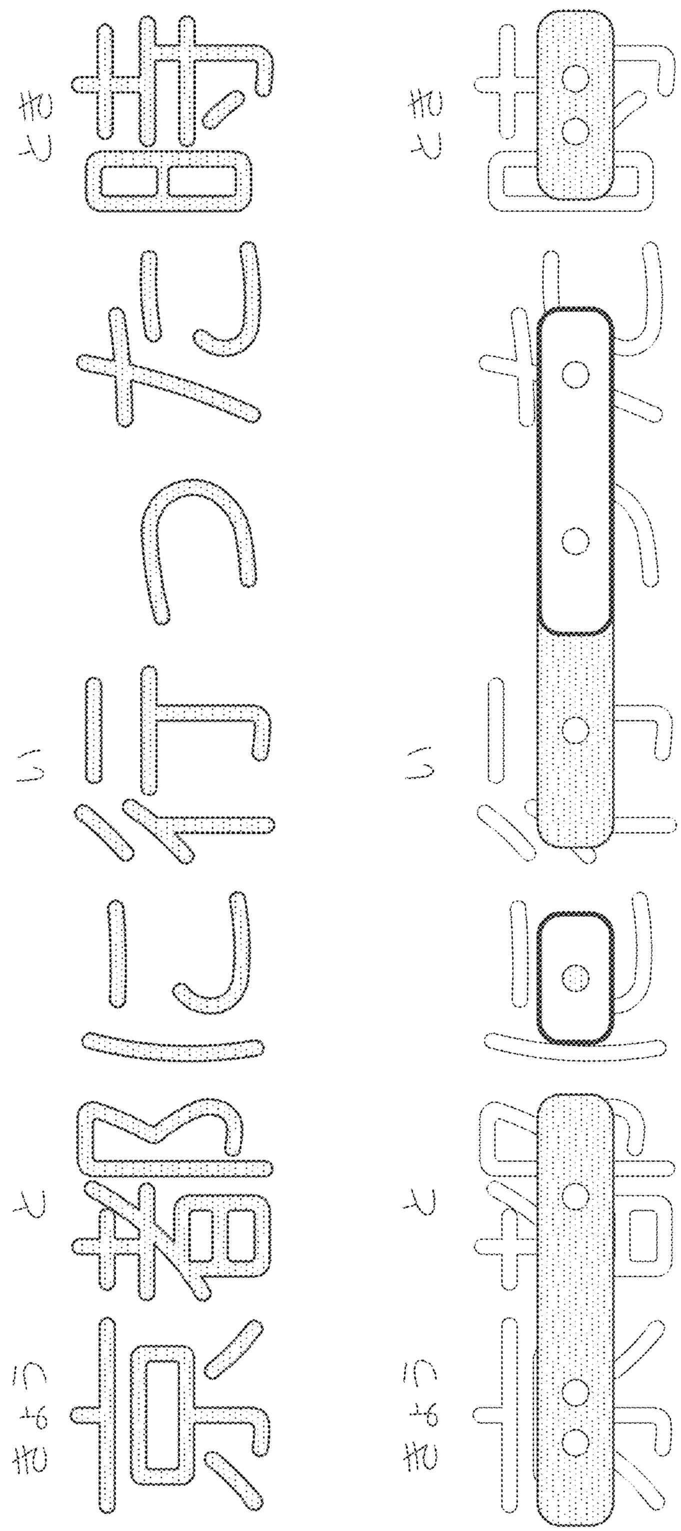

FIG. 14B shows an alternative embodiment, again illustrating redaction for Japanese text. The Japanese writing system employs four classes of characters: "kanji" (Chinese ideograms numbering in the thousands, where each character may have multiple pronunciations in different contexts, which need be learned individually); "hiragana", "katakana" (collectively "kana", parallel syllabaries of around fifty symbols each with fixed pronunciation); and "romaji" (a mapping of the kana pronunciation expressed in the Latin alphabet) which we shall ignore in this example. A pronunciation guide to kanji may be provided by annotating the corresponding hiragana as a superscript above the Chinese characters, as illustrated in FIG. 14B.

Of note, a single kanji might be pronounced with one, two, or more syllables, whereas each kana corresponds to, at most, one syllable (sometimes two kana together will be pronounced as one syllable, with the second kana rendered at a smaller size).

Given that this method uses the visual style of redaction to communicate partial information about the underlying structure or expression of the redacted text, FIG. 14B shows an embodiment by which both the class of character (kanji versus kana) and the number of syllables for each character can be communicated under redaction.

The kanji are redacted with a dark background (e.g. black) and the kana are redacted with a light background (e.g. white), with the length of the redaction bars indicating the length of the word in written characters. In addition, the number of dots embedded inside the redaction bar (rendered with a color that contrasts with the redaction bar) indicate the number of spoken syllables required for each redacted character.

In much the same way that the word or corresponding redaction bar currently spoken in the audio, under the cursor, may be highlighted in a distinctive color (e.g., teal), the dots within the redaction bar may be highlighted in synchronization with the audio representing each spoken syllable.

Whether a particular type or instance of a word group is shown as text or redacted can be controlled dynamically by client state in the client application representing the settings chosen by the user (see, e.g., FIG. 3A above), whether the user has activated the assistant button, or by recording user taps/clicks on the word groups on the touch display.

The "rewind state" behavior described above (e.g., as illustrated with respect to FIGS. 4A, 4B and 4C) may utilize two 'cursors' to track listening state in the content, a current listening cursor (also referred to as just the "cursor") and a "furthest played element" cursor.

In one embodiment, both of these cursor variables store a reference to a word in the transcript (for example the identifier for the word element such as an "address"). These two cursors will be the same, except when the user has rewound. When the current listening position has caught up again to where the user was before rewinding then the two cursors will continue to be the same until the next time the user rewinds or jumps back. Therefore, embodiments of the Jiveworld client application 1204 can compare these two cursors to figure out whether the user is in a rewind state or not, and to modify the user interface exposed accordingly.

With reference back to FIG. 12A, it will be helpful here to discuss embodiments of the implementation of the client application 1204 in more detail. The client application 1204 may include a visual interface 1284 adapted to present the visual display of the content in the visual interface 1284 as discussed, and an audio player 1282 for presenting the corresponding audio content. This audio player 1282 may, for example, be an audio player of the device 1202 on which the application 1204 is executing, or which may be in communication with such a native audio player application or library. The visual interface 1284 and visual display may be dynamically generated such that it is synchronized with the audio content being played in the audio player 1282.

When the application 1204 receives an audio file 1212 and a corresponding T&T file 1214, the application 1204 reads the T&T file 1214 and instantiates an object for each element (a.k.a. an entity) (e.g., passage, paragraph, sentence, word group, word, etc.) defined in the T&T file 1214. Each object for each element is thus an instantiated object that is scoped with the metadata defined for that element as defined for that element in the T&T file (e.g., the object for the element is instantiated with all metadata for variables for the element as described in the T&T file 1214). Each object of each element type includes methods that define how that element type is to be rendered based on the local data of the object and the global state maintained by the application 1204. An element (e.g., a visually rendered component of the interface) may thus be rendered by the corresponding object that reacts to a global state maintained by the application 1204.

Figure 15:
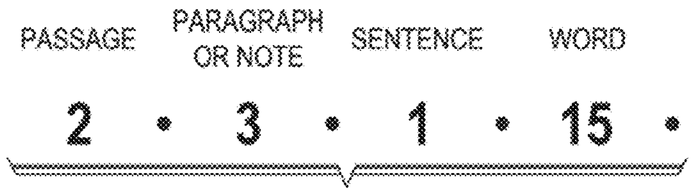
FIGS. 15 and 16 are diagrams depicting the use of an address for elements.

In particular, each element may be assigned an "address" that captures both the linear order of those elements and the hierarchical structure of containing elements outside. A "word" element, for example, may be contained in a "word group" element, which in turn may be contained in a "sentence" element, which in turn may be contained in a "paragraph" element, which itself may be contained in a "passage" element. The address may include a component for each element in the hierarchy of elements. An embodiment of this is illustrated in FIG. 15, which is described in more detail below.

The application 1204 can maintain a global state of a cursor synchronized, or otherwise set, based on the playback of the audio content in the audio player 1282. This cursor may hold the value of an address of the transcript element corresponding to the section of audio currently being played back in the audio player 1282. Specifically, the client application 1204 may monitor the time of the current play position in the audio file by the audio player 1282, and based on that play position (expressed in time units) can determine the visual transcript element at that particular time (e.g., based on the timestamps for each word or segment of the transcript), and determine the address of that element, and set the current cursor address to the address of that element, and broadcast the updated cursor address for consumption by each object for each element. The client application 1204 may also monitor user interaction with the presented visual depiction such that the cursor and audio player play position can be set based on the user's interaction with the visual transcript (e.g., as depicted in FIG. 4D if the user taps a play button 428 for a specific sentence, the cursor may be set to the address of the first word of that sentence).

The corresponding object for each element has methods that are adapted to render that object based on the state of the cursor, as well as other states in the application (e.g., assistance settings). The objects for elements that are rendered are thus registered with client application 1204 to listen to whether cursor has changed and then make a determination if it should change its state based on the cursor.

Thus, the object for each element of each element type (e.g., passage, paragraph, sentence, word group, word, etc.) may get a notification or the like when the cursor changes and can render itself (e.g., show, hide, redact, change color, underline, display associated hint, etc.) based on the state of the cursor (e.g., the address associated the cursor) and any data specific to that object for the element or any other local or global state. For example, for a particular object for an element, if the address held by the cursor corresponds to the address of that element the element may render itself in a particular manner (e.g., highlighted or unredacted) while if the address does not correspond to the element the element may render itself in a second way (e.g., greyed out or redacted). For example, the object for the element can determine if the cursor (e.g., address) is before the element of the object or after the element of the object and render itself differently according to that definition.

As an example of another global state variable that may be maintained by client application 1204 and which may influence the rendering of an element by objects for those elements, is a "furthest played element" which may hold the address of the furthest element that a user has visited during a current listen-through of the audio presentation of the content. In other words, the cursor and the furthest played element may differ when the user had rewound or jumped back in the content being presented. Thus, each object for each element may utilize these states to determine whether the associate element is currently the same address as the address held by the cursor (e.g., is it "under" cursor) or if that element has been previously visited. Rendering of the element by the object in the visual presentation can thus depend on those determinations. There are other states maintained by client application 1204 that may be used to render an element by an object without loss of generality.

Embodiments of the implementation of the client application 1204 will now be discussed in more detail. In one embodiment, the fundamental playable unit of content is the Chapter—a discrete section (e.g., several minutes) of an audio track, interspersed with notes and hints that may not be part of the audio. If a piece of content is longer than a few minutes it may be broken up into chapters, as discussed.

The flow control within an episode may be relatively simple. A user may be encouraged to review each Chapter in sequential order (and repeat Chapters) until the user is comfortable with the Chapter, and then proceed to the next Chapter (e.g., which can be access randomly via a chapter menu). As it is desired that the user be focused on only one thing at a time, the interface of the client application 1204 is adapted such that, as much as possible the user should not be listening to something in the presentation of the audio content that is different than what is being read or seen in the visual presentation of the content.

This means that when the application presents certain content that is not in the audio file (e.g., chapter notes, passage hints, etc.) to the user (e.g., for the first time) the audio playback may be paused in the audio player 1282. The audio playback may also be paused if a user interacts with the visual presentation in a particular manner (e.g., tapping on an underlined word to view a definition or note). Thus, while a user may be interacting with a chapter (e.g., as represented by an isChapterPlaying variable in the global state of the client application 1204) this may not be the same thing as whether the audio content for that chapter is being played by the audio player 1282 (e.g., as represented by a isAudioPlaying variable in the global state of the client application 1204).

Looking at FIG. 15, the visual elements that are visually revealed in the interface (sometimes referred to as visual elements or script elements) may have both linear order, and compositional structure. For example:

Compositional Structure: Passages > Paragraphs > Sentences > Words

Linear Order: passage hint-> passage note-> sentence highlight-> word 1-> word 2 etc.

Each of these elements may be given an address in a format that captures both ordinality and compositional structure as depicted in the FIG. 15. In one embodiment, an address for an element can have up to four elements. Indexes are zero based which makes for simple lookup of an element in the nested array or tree structure: Element with address "2.0.1.0"⇒ elements[2][0][1][0]. In some embodiments there may by a separator (e.g., a period) between each index of the address, including a trailing separator that may be useful for the comparisons of addresses.

Such addresses may be understood with reference to the examples given below in relative sequence order:

| Address | Type | Meaning |
|---|---|---|
| 0. | StartOfChapter | Special fixed address for before content starts playing |
| 1.0. | Note | 1st Passage, 1st Chapter Note |
| 1.1. | Note | 1st Passage, 2nd Chapter Note |
| 1.3.1. | Sentence | 1st Paragraph, 1st Sentence - before the first Passage Hint |
| 2. | PassageHint | 2nd Passage Hint |
| 2.1. | Note | 2nd Passage, 2nd Note |
| 2.2. | Paragraph (speaker) | 2nd Passage, 1st Paragraph |
| 2.2.1. | Sentence | 2nd Passage, 1st Paragraph, 2nd Sentence |
| 2.2.1.14. | Word | 2nd Passage, 1st Paragraph, 2nd Sentence, 15th Word |
| 999. | FinishOfChapter | Special fixed address for after the last element in Chapter |

Figure 16:
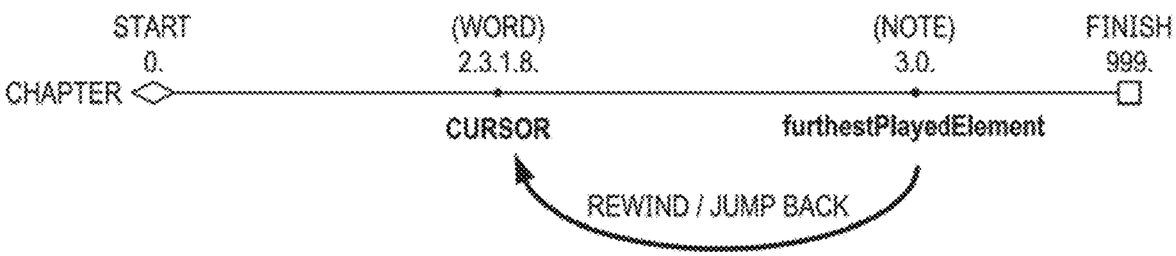

There are thus at least two key values or variables in the global state of the client application 1204 that point to an address: 1) a (current) cursor—the address of the element that the user is currently focused on (e.g., in the audio presentation of the content through the audio player 1282) and 2) a furthestPlayedElement cursor—the address of the furthest element that the user has visited in their current listen-through the current chapter. In some embodiments, the cursor and the furthestPlayedElement point to different addresses only when the user has rewound or jumped back in the chapter. When the user re-listens to a chapter, both the cursor and the furthestPlayedElement are reset. FIG. 16 depicts an illustration of these two variables in the context of a timeline for a chapter.

Figure 17:
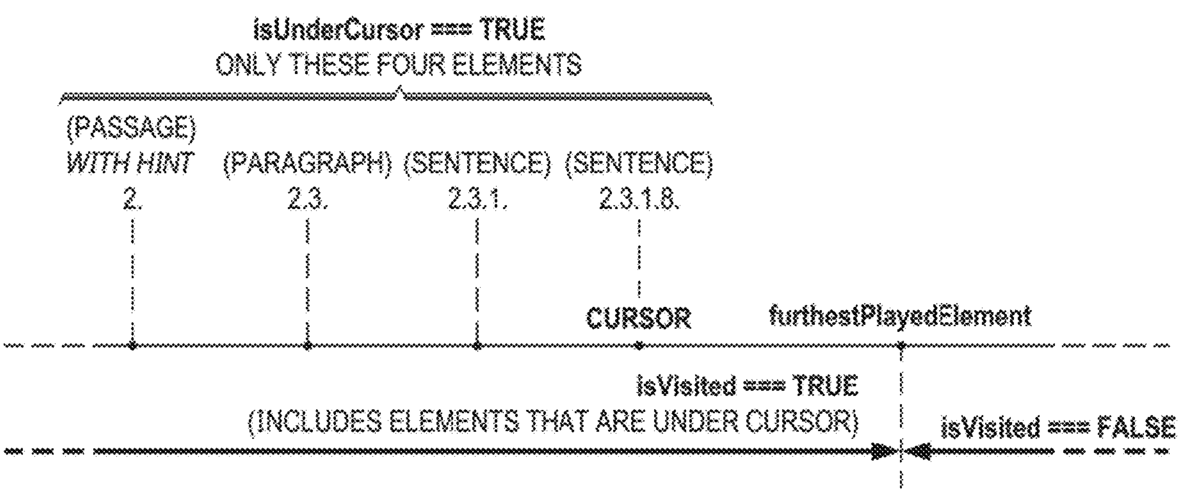
FIG. 17 is a diagram depicting the use of a cursor.

Thus, an important invariant of the fact that the cursor and furthestPlayedElement point to different addresses in cases where a user has rewound or otherwise moved the cursor manually is that according to embodiment, in the client application the cursor≤furthestPlayedElement. Thus each element (e.g., object instantiated for an element) can calculate two Boolean states that may be used in the determination of how that element is rendered visually in the visual presentation: isUnderCursor=f (address of the element, address of the cursor) and isVisited=f (address of that element, furthestPlayedElement). The use of these variable to determine whether an element has been visited by a user is depicted in FIG. 17

An example JavaScript for the underlying logic for element addresses and the calculation of these Boolean values by each element is:

```
// valid values: 1. 0.2. 1.25.3. 1.2.3.44.
// invalid values: 1.2.3 (no trailing period), 1.2.3.4.5.
const addressRE = /^(\d+\.){1,4}$/;
class Address {
  constructor (address) {
    if (!addressRE.test(address)) {
      throw new Error("Malformed address");
    }
    this._address = address;
    this._elements =
        address.split('.', 4).map( x => parseInt(x, 10));
  }
  equals (that) {
    return this._address === that._address;
      }
  isChildOf (that) {
    return !this.equals(that)
        && this._address.startsWith(that._address);
  }
  isBefore (that) {
    let maxIndex = Math.min(
        this._elements.length,
        that._elements.length);
    for (var i=0; i<maxIndex; i++) {
      let diff = this._elements[i] - that._elements[i];
      if (diff < 0) return true;
      if (diff > 0) return false;
    }
    return that.isChildOf(this);
  }
}
class ScriptElement {
  ...
  isUnderCursor (address = this.address) {
    return cursor.equals(address)
        || cursor.isChildOf(address));
  }
  isVisited ( ) {
    return this.address.isBefore(furthestPlayedElement);
  }
  ...
}
```

Figure 18:
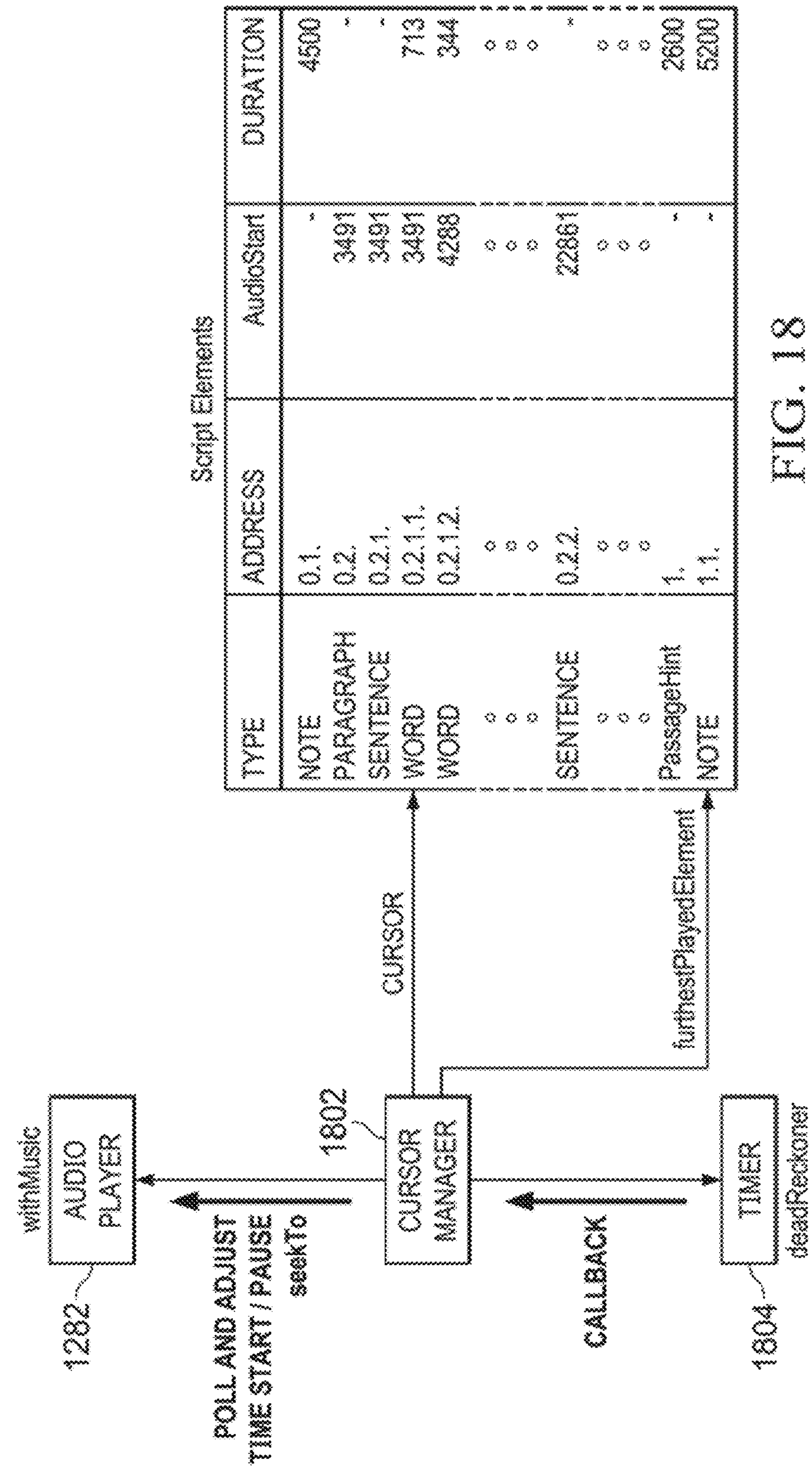
FIG. 18 is a block diagram illustrating an architecture for a cursor manager.

A cursor manager of the client application 1204 may thus be responsible for maintaining the current cursor, the furthest played element and other global state variables for use by the objects for each element such that the visual interface may be effectively rendered. Moving now to FIG. 18, a block diagram of one embodiment of a cursor manager 1802 is depicted. The cursor manager 1802 may utilize abstract addresses that reflect both order and structure of the elements and determine variables based on the current address to drive the presentation of the elements by the objects associated with those elements. In other embodiments, the cursor manager 1802 may use the audio player's 1282 current time as the canonical time that these "time aware elements" (e.g., object that change their display state based on time or a position of the cursor) are keyed off for some of their behavior.

Accordingly, in certain embodiments, script elements (e.g., words, sentences, paragraphs, passage hints, notes, etc.) may derive their visual behavior from two (e.g., Boolean) values that may be determined by their respective objects from values determined by the cursor manager 1802: 1) isUnderCursor— calculated by comparing the address of the element to the address of the cursor and 2) isVisited— calculated by comparing the address of the element to the address of the address in furthestPlayedElement.

The cursor manager 1802 may thus set the global state for cursor and furthestPlayedElement and manage an internal timer 1804 (deadReckoner) to move the cursor at the right time by intermittently polling the audio player 1282 to adjust the dead reckoner timer 1804 so that presentation of words in the visual depiction of the content are correctly synchronized with the presentation of the audio in the audio player 1282. The cursor manager 1802 may also pause/play the audio player 1282 according to what type of script element is currently under the cursor and manage the rewind logic (e.g., by adjusting the cursor and furthestPlayedElement variables).

Specifically, according to certain embodiments, the cursor manager 1802 may determine when to increment cursor and furthestPlayedElement while isChapterPlaying is true based on the dead reckoner timer 1804; handle the rewind/jump logic so set the correct values of cursor and furthestPlayedElement are adjusted when a user interacts with the visual presentation; and control the current audio player 1802 (e.g., calling play( ) pause( ) seekTo( ) setTimeStretch( ) of the audio player 1802).

The cursor manager 1802 uses a dead reckoner timer 1804 to decide when to increment the cursor. In one embodiment, the logic for setting the timer may be as follows:

```
handler ( ) {
  if (!isChapterPlaying) { // user has paused the Studyview
    return;
  }
  cursor.increment( ); // next ScriptElement with duration > 0
  let element = cursor.element;
  let duration = element.duration;
  switch (element.type) {
    // handle non-audio elements
    case 'Passage':
    case 'Note':
      if (isAudioPlaying) {
        audioPlayer.pause( );
      }
      break;
    // all other elements are audio elements
    default:
      let start = element.audioStart;
      if (!isAudioPlaying) {
        audioPlayer.seekTo(start);
        audioPlayer.play( );
      }
      else {
        // we check the actual time of the audioPlayer
        // against what we think it should be (i.e start)
        adjustment = start - audioPlayer.currentTime;
        duration += adjustment;
      }
      // need to take into account time stretching
      duration = duration / audioPlayer.timeStretchFactor
      break;
  } // end switch
  deadReckoner.setInterval(this.handler, duration);
}
```

Objects for script elements (e.g., words, sentences, paragraphs, passage hints, notes, etc.) may also share or maintain properties related to time, including:

- duration (e.g., in milliseconds)—how long the corresponding element for the object should be highlighted. Some elements may not have duration (e.g., sentence, paragraph—since their duration is implied by the current word or words making up the element combined with isUnderCursor logic above).
- duration may be used for the determination of the dead reckoner timer 1802 while isChapterPlaying is true as detailed above.
- audioStart (e.g., in milliseconds)—timestamp in the audio content where the corresponding element starts (e.g., this may be maintained only for the elements that are in the audio content).
- audioStart may be used for: calling seekTo( ) on the audio player to move its playing position on rewind/jump; adjusting the dead reckoner timer 1804 by comparing the actual audio player time with the dead reckoner timer 1804.

It may now be useful to describe how selective redaction of words of the transcript is accomplished in particular embodiments. The following JavaScript-like pseudocode thus illustrates how the logic for selective redaction of words in the transcript may operate according to one embodiment. In this case a word object (e.g., element) decides whether to render itself as redacted (e.g., a lozenge should be rendered) or unredacted (the text or the word should be rendered) by observing various states in the client application.

Take, for example, a word that is part of a vocabulary word group G. As an example, assume that this word has been visited by the cursor (played in the audio) and is therefore eligible to be unredacted. Then, according to the example code, the word would display unredacted if (e.g., in some cases and only if) at least one of these conditions holds true: the learner (or system) has chosen to unredact the specific word group G (for example, by tapping on any of its words in the display); or the learner (or system) has chosen for all word groups of the type "VOCAB" to automatically unredact when visited; or the learner (or system) has chosen for all the text in the transcript to unredact when visited.

```
class CursorManager {
  cursor: Address; // currently playing word
  furthestPlayedElement: Address; // beyond cursor if learner
has rewound
  ...
};
// tracks the state of the assist settings chosen by the learner
// or set programmatically
class AssistanceManager {
  // fields for which word group types to auto-unredact
  autoUnredactVocab: boolean;
  autoUnredactSIC: boolean; // for incorrect usage
  autoUnredactTrickyBits: boolean;
  autoUnredactAnnotations: boolean;
  // learner can choose to view full transcript regardless
  // of settings above
  showAllText:boolean;
  ...
};
class WordGroup {
  groupType: Enum; // one of VOCAB, SIC, TRICKYBIT,
  ANNOTATION
  // tracks if user has tapped on this word group instance
  // when it was redacted, in order to unredact it
  isManuallyUnredacted: boolean;
  assistanceManager: AssistanceManager;
  // returns true if the words in this word group are allowed to
  // display themselves unredacted. Regardless, the word
instance
  // will not unredact if it hasn't been played yet (see below)
  // furthestPlayedElement address.
  function canMyWordsUnredact ( ) {
    // has the user explicitly chosen to reveal this word group
    if (this.isManuallyUnredacted) {
      return true;
    }
    if (this.assistanceManager.showAllText) {
      return true; // this overrides the word group type
specific settings
    }
    switch (this.groupType) {
      case VOCAB:
        if (assistanceManager.autoUnredactVocab) {
          return true;
        }
        break;
      case SIC:
```

-continued

```
            if (assistanceManager.autoUnredactSIC) {
                return true;
            }
            break;
        case TRICKYBIT:
            if (assistanceManager.autoUnredactTrickyBits) {
                return true;
            }
            break;
        case ANNOTATION:
            if (assistanceManager.autoUnredactAnnotations) {
                return true;
            }
            break;
    } // end switch
    if (this.groupType == VOCAB
            && assistanceManager.autoUnredactVocab) {
        return true;
    }
    return false;
  }
};
// represents a Word element in the visible transcript
class Word {
  cursorManager: CursorManager;
  assistanceManager: AssistanceManager;
  wordGroup: WordGroup; // null if this isn't in a word group
  address: Address; // to compare with CursorManager cursors
  isUnredacted: boolean; // memorized derived local state
  // data bound (i.e. reactive) to changes in cursorManager,
  // assistanceManager and wordGroup
  function calculateIfUnredacted ( ) {
    // always redact if the player hasn't visited the word
    if (cursorManager.furthestPlayedElement.isBefore(address)) {
        this.isUnredacted = false;
        return;
    }
    // else check with my word group if I have one
    if (this.wordGroup && this.wordGroup.canMyWordsUnredact( )) {
        this.isUnredacted = true;
        return;
    }
    this.isUnredacted = false;
  }
  ...
};
```

Embodiments as disclosed will be more clearly understood with reference to the enclosed Appendices which depict an example data for a T&T file and example data models for elements. It should be noted that the embodiments and examples depicted in the Appendices are given by way of example only, and that any restrictive language used in conjunction with such embodiments such as "must", "requires", "needed" or the like should be taken as applying only to those specific embodiments and not to embodiments as disclosed generally.

The invention and the various features and advantageous details thereof are explained more fully with reference to the nonlimiting embodiments that are illustrated in the accompanying drawings and detailed in the following description.

Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard drive (HD)), hardware circuitry or the like, or any combination.

Embodiments of a hardware architecture for implementing certain embodiments is described herein. One embodiment can include one or more computers communicatively coupled to a network.

At least portions of the functionalities or processes described herein can be implemented in suitable computer-executable instructions. The computer-executable instructions may be stored as software code components or modules on one or more computer readable media (such as non-volatile memories, volatile memories, direct access storage drive (DASD) arrays, magnetic tapes, floppy diskettes, hard drives, optical storage devices, etc. or any other appropriate computer-readable medium or storage device). In one embodiment, the computer-executable instructions may include lines of compiled C++, Java, hypertext markup language (HTML), or any other programming or scripting code.

Additionally, the functions of the disclosed embodiments may be shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

Appendix A

{
  "objectClass": "Chapter",
  "entityType": "chapter",
  "slug": "alias-el-condor-1/3",
  "position": 3,
  "title": "Un mal comienzo",
  “titleEnglish ": "A Bad Start ",
  "recap ": null,
  "normalAudioUrl ": "https://bucketeer-5004978c-f427-4c97-b0f8-32e3484395b1.s3.amazonaws.com/public/prod/chapter/normal_audio/22068-alias- el-condor-1-v11-ch3-trimmed-20200130-7-yecgj2.mp3",
  "noMusicAudioUrl": null,
  "durationMillis": 169831,
  "markCompleteMillis": 159831,
  "notes": [],
  "elements": [
    {
      "objectClass": "GenericElement",
      "entityType": "beginning_of_chapter",
      "address": "000."
    },
    {
      "objectClass": "Passage",
      "entityType": "passage",
      "address": "001.",
      "hint": "Returning to 1989: excitement leading up to the qualifiers",
      "audioStart": 0,
      "duration": 7350,

```
    "jumpToAddress": "001.000.000.",
    "elements": [
      {
        "objectClass": "Paragraph",
        "entityType": "paragraph",
        "address": "001.000.",
        "audioStart": 727,
        "speaker": "Daniel Alarcón",
        "isSpeakerLabelRequired": true,
        "elements": [
          {
            "objectClass": "Sentence",
            "entityType": "sentence",
            "address": "001.000.000.",
            "audioStart": 727,
            "translation": "Let's get back to the qualifying
rounds.",
            "elements": [
              {
                "address": "001.000.000.000.",
                "objectClass": "WordGroup",
                "entityType": "word_group",
                "groupType": "normal",
                "elements": [
                  {
                    "text": "Volvamos",
                    "address": "001.000.000.000.000.",
                    "audioStart": 727,
                    "duration": 419,
                    "navigationStop": true,
```

```
          "entityType": "word"
        },
        {
          "text": "a",
          "address": "001.000.000.000.001.",
          "audioStart": 1146,
          "duration": 126,
          "entityType": "word"
        },
        {
          "text": "las",
          "address": "001.000.000.000.002.",
          "audioStart": 1272,
          "duration": 210,
          "entityType": "word"
        },
        {
          "text": "eliminatorias.",
          "address": "001.000.000.000.003.",
          "audioStart": 1482,
          "duration": 671,
          "entityType": "word"
        }
      ],
      "chapterPosition": 3
    }
  ],
},
{
  "objectClass": "Gap",
```

```
  "entityType": "gap",
  "address": "001.000.001.",
  "audioStart": 2153,
  "duration": 74
},
{
  "objectClass": "Sentence",
  "entityType": "sentence",
  "address": "001.000.002.",
  "audioStart": 2227,
  "translation": "The expectation was enormous.",
  "elements": [
    {
      "address": "001.000.002.000.",
      "objectClass": "WordGroup",
      "entityType": "word_group",
      "groupType": "normal",
      "elements": [
        {
          "text": "La",
          "address": "001.000.002.000.000.",
          "audioStart": 2227,
          "duration": 161,
          "navigationStop": true,
          "entityType": "word"
        }
      ],
      "chapterPosition": 3
    },
    {
```

```
  "address": "001.000.002.001.",
  "id": "23-expectativa",
  "objectClass": "WordGroup",
  "entityType": "word_group",
  "groupType": "vocab",
  "elements": [
    {
      "text": "expectativa",
      "address": "001.000.002.001.000.",
      "audioStart": 2388,
      "duration": 523,
      "wordGroupId": "23-expectativa",
      "entityType": "word"
    }
  ],
  "text": "expectativa",
  "usage": "expectativa",
  "note": "expectation",
  "chapterPosition": 3
},
"address": "001.000.002.002.",
"objectClass": "WordGroup",
"entityType": "word_group",
"groupType": "normal",
"elements": [
  {
    "text": "era",
    "address": "001.000.002.002.000.",
    "audioStart": 2911,
    "duration": 201,
```

```
          "entityType": "word"
        },
        {
          "text": "gigante.",
          "address": "001.000.002.002.001.",
          "audioStart": 3112,
          "duration": 402,
          "entityType": "word"
        }
      ],
      "chapterPosition": 3
    }
  ],
}
],
},
{
  "objectClass": "Gap",
  "entityType": "gap",
  "address": "001.001.",
  "audioStart": 3514,
  "duration": 378
},
{
  "objectClass": "Paragraph",
  "entityType": "paragraph",
  "address": "001.002.",
  "audioStart": 3892,
  "speaker": "Jorge Hevia",
  "isSpeakerLabelRequired": true,
```

```
"elements": [
  {
    "objectClass": "Sentence",
    "entityType": "sentence",
    "address": "001.002.000.",
    "audioStart": 3892,
    "translation": "I think there was a kind li— of... of... of shared madness that fundamentally centered on... on the team, the Chilean National Team that could defeat Brazil.",
    "elements": [
      {
        "address": "001.002.000.000.",
        "objectClass": "WordGroup",
        "entityType": "word_group",
        "groupType": "normal",
        "elements": [
          {
            "text": "Yo",
            "address": "001.002.000.000.000.",
            "audioStart": 3892,
            "duration": 186,
            "navigationStop": true,
            "entityType": "word"
          }
        ],
        "chapterPosition": 3
      },
      {
        "address": "001.002.000.001.",
        "id": "40-creo",
```

```
  "objectClass": "WordGroup",
  "entityType": "word_group",
  "groupType": "tricky",
  "elements": [
    {
      "text": "creo",
      "address": "001.002.000.001.000.",
      "audioStart": 4078,
      "duration": 279,
      "wordGroupId": "40-creo",
      "entityType": "word"
    }
  ],
  "text": "creo",
  "usage": "creo",
  "chapterPosition": 3
},
"address": "001.002.000.002.",
"objectClass": "WordGroup",
"entityType": "word_group",
"groupType": "normal",
"elements": [
  {
    "text": "que",
    "address": "001.002.000.002.000.",
    "audioStart": 4357,
    "duration": 418,
    "entityType": "word"
  }
],
```

```
  "chapterPosition": 3
},
{
  "address": "001.002.000.003.",
  "id": "53-hubo",
  "objectClass": "WordGroup",
  "entityType": "word_group",
  "groupType": "tricky",
  "elements": [
    {
      "entityType": "gap",
      "audioStart": 4775,
      "duration": 598,
      "address": "001.002.000.003.000."
    },
    {
      "text": "hubo",
      "address": "001.002.000.003.001.",
      "audioStart": 5373,
      "duration": 223,
      "wordGroupId": "53-hubo",
      "navigationStop": true,
      "entityType": "word"
    }
  ],
  "text": "hubo",
  "usage": "hubo",
  "chapterPosition": 3
},
{
```

```
  "address": "001.002.000.004.",
  "objectClass": "WordGroup",
  " entityType ": "
  word_group ",
  "groupType": "normal",
  "elements": [
    {
      "text": "una",
      "address": "001.002.000.004.000.",
      "audioStart": 5596,
      "duration": 186,
      "entityType": "word"
    }
  ],
  "chapterPosition": 3
},
{
  "address": "001.002.000.005.",
  "id": "57-especie",
  "objectClass": "WordGroup",
  "entityType": "word_group",
  "groupType": "vocab",
  "elements": [
    {
      "text": "especie",
      "address": "001.002.000.005.000.",
      "audioStart": 5782,
      "duration": 335,
      "wordGroupId": "57-especie",
      "entityType": "word"
```

```
    }
  ],
  "text": "especie",
  "usage": "especie",
  "note": "kind, type",
  "chapterPosition": 3
},
{
  "address": "001.002.000.006.",
  "objectClass": "WordGroup",
  "entityType": "word_group",
  "groupType": "normal",
  "elements": [
    {
      "text": "co—",
      "address": "001.002.000.006.000.",
      "audioStart": 6117,
      "duration": 186,
      "entityType": "word"
    },
    {
      "text": "de...",
      "address": "001.002.000.006.001.",
      "audioStart": 6303,
      "duration": 261,
      "entityType": "word"
    },
    {
      "text": "de...",
      "address": "001.002.000.006.002.",
```

```
        "audioStart": 6564,
        "duration": 261,
        "entityType": "word"
      },
      {
        "text": "de",
        "address": "001.002.000.006.003.",
        "audioStart": 6825,
        "duration": 149,
        "entityType": "word"
      }
    ],
    "chapterPosition": 3
  },
  {
    "address": "001.002.000.007.",
    "id": "69-locura",
    "objectClass": "WordGroup",
    "entityType": "word_group",
    "groupType": "vocab",
    "elements": [
      {
        "text": "locura",
        "address": "001.002.000.007.000.",
        "audioStart": 6974,
        "duration": 298,
        "wordGroupId": "69-locura",
        "entityType": "word"
      },
      {
```

```
      "text": "colectiva",
      "address": "001.002.000.007.001.",
      "audioStart": 7272,
      "duration": 410,
      "wordGroupId": "69-locura",
      "entityType": "word"
    }
  ],
  "text": "locura colectiva",
  "usage": "locura colectiva",
  "note": "shared madness",
  "chapterPosition": 3
},
{
  "address": "001.002.000.008.",
  "objectClass": "WordGroup",
  "entityType": "word_group",
  "groupType": "normal",
  "elements": [
    {
      "entityType": "gap",
      "audioStart": 7682,
      "duration": 423,
      "address": "001.002.000.008.000."
    },
    {
      "text": "que",
      "address": "001.002.000.008.001.",
      "audioStart": 8105,
      "duration": 173,
```

```
        "navigationStop": true,
        "entityType": "word"
      },
      {
        "text": "se",
        "address": "001.002.000.008.002.",
        "audioStart": 8278,
        "duration": 139,
        "entityType": "word"
      },
      {
        "text": "centró",
        "address": "001.002.000.008.003.",
        "audioStart": 8417,
        "duration": 277,
        "entityType": "word"
      }
    ],
    "chapterPosition": 3
  },
  {
    "address": "001.002.000.009.",
    "id": "86-fundamentalmente",
    "objectClass": "WordGroup",
    "entityType": "word_group",
    "groupType": "tricky",
    "elements": [
      {
        "text": "fundamentalmente",
        "address": "001.002.000.009.000.",
```

```
        "audioStart": 8694,
        "duration": 623,
        "wordGroupId": "86-fundamentalmente",
        "entityType": "word"
      }
    ],
    "text": "fundamentalmente",
    "usage": "fundamentalmente",
    "chapterPosition": 3
  },
  {
    "address": "001.002.000.010.",
    "objectClass": "WordGroup",
    "entityType": "word_group",
    "groupType": "normal",
    "elements": [
      {
        "text": "en...",
        "address": "001.002.000.010.000.",
        "audioStart": 9317,
        "duration": 242,
        "entityType": "word"
      },
      {
        "text": "en",
        "address": "001.002.000.010.001.",
        "audioStart": 9559,
        "duration": 139,
        "entityType": "word"
      },
```

```
{
  "text": "el",
  "address": "001.002.000.010.002.",
  "audioStart": 9698,
  "duration": 139,
  "entityType": "word"
},
{
  "text": "equipo,",
  "address": "001.002.000.010.003.",
  "audioStart": 9837,
  "duration": 312,
  "entityType": "word"
},
{
  "text": "en",
  "address": "001.002.000.010.004.",
  "audioStart": 10149,
  "duration": 139,
  "entityType": "word"
},
{
  "text": "esa",
  "address": "001.002.000.010.005.",
  "audioStart": 10288,
  "duration": 173,
  "entityType": "word"
},
{
  "text": "selección",
```

```
        "address": "001.002.000.010.006.",
        "audioStart": 10461,
        "duration": 381,
        "entityType": "word"
      },
      {
        "text": "chilena,",
        "address": "001.002.000.010.007.",
        "audioStart": 10842,
        "duration": 346,
        "entityType": "word"
      }
    ],
    "chapterPosition": 3
  },
  {
    "address": "001.002.000.011.",
    "objectClass": "WordGroup",
    "entityType": "word_group",
    "groupType": "normal",
    "elements": [
      {
        "entityType": "gap",
        "audioStart": 11187,
        "duration": 368,
        "address": "001.002.000.011.000."
      },
      {
        "text": "de",
        "address": "001.002.000.011.001.",
```

"audioStart": 11555,
"duration": 144,
"navigationStop": true,
"entityType": "word"
},
{
"text": "que",
"address": "001.002.000.011.002.",
"audioStart": 11699,
"duration": 180,
"entityType": "word"
},
{
"text": "se",
"address": "001.002.000.011.003.",
"audioStart": 11879,
"duration": 144,
"entityType": "word"
},
{
"text": "le",
"address": "001.002.000.011.004.",
"audioStart": 12023,
"duration": 144,
"entityType": "word"
},
{
" text ": "
podí a ",
"address": "001.002.000.011.005.",

```
          "audioStart": 12167,
          "duration": 252,
          "entityType": "word"
        },
        {
          "text": "vencer",
          "address": "001.002.000.011.006.",
          "audioStart": 12419,
          "duration": 288,
          "entityType": "word"
        },
        {
          "text": "a",
          "address": "001.002.000.011.007.",
          "audioStart": 12707,
          "duration": 108,
          "entityType": "word"
        },
        {
          "text": "Brasil.",
          "address": "001.002.000.011.008.",
          "audioStart": 12815,
          "duration": 324,
          "entityType": "word"
        }
      ],
      "chapterPosition": 3
    }
  ],
},
```

```
{
  "objectClass": "Gap",
  "entityType": "gap",
  "address": "001.002.001.",
  "audioStart": 13137,
  "duration": 561
},
{
  "objectClass": "Sentence",
  "entityType": "sentence",
  "address": "001.002.002.",
  "audioStart": 13698,
  "translation": "And that would be historic.",
  "elements": [
    {
      "address": "001.002.002.000.",
      "objectClass": "WordGroup",
      "entityType": "word_group",
      "groupType": "normal",
      "elements": [
        {
          "text": "Y",
          "address": "001.002.002.000.000.",
          "audioStart": 13698,
          "duration": 82,
          "navigationStop": true,
          "entityType": "word"
        },
        {
          "text": "eso",
```

```
            "address": "001.002.002.000.001.",
            "audioStart": 13780,
            "duration": 136,
            "entityType": "word"
          },
          {
            "text": "era",
            "address": "001.002.002.000.002.",
            "audioStart": 13916,
            "duration": 136,
            "entityType": "word"
          },
          {
            "text": "historia.",
            "address": "001.002.002.000.003.",
            "audioStart": 14052,
            "duration": 549,
            "entityType": "word"
          }
        ],
        "chapterPosition": 3
      }
    ],
  }
 ],
}
],
}
```
Appendix B Data Models:

Example static models used for episodes and chapters:

| Models | Key Properties | Desc |
|---|---|---|
| Episode | title<br>description<br>speakers (with bios etc.) | Represents a podcast.<br>Divided into one or more chapters (formerly: Track) |
| Chapter | title<br>translated__title<br>normal__audio__url<br>no__music__audio__url<br>elements<br>vocab__sentence__map | Core playable entity (formerly: Dialog) (translated__title moved up from elements) |
| Element | address | Sequenced pieces of the study view |

Example models for script elements:

| Element Type | Key Properties | |
|---|---|---|
| passage | hint<br>duration | |
| paragraph | speaker<br>isSpeakerLabelRequired | isSpeakerLabelRequired - true if the speaker is different from the previous paragraph, or if the first paragraph in a passage. Precalculated for convenience. |
| sentence | translation<br>markers<br>wordGroups<br>previousSentence | markers are Word addresses, used for the rewind logic on long sentences<br>vocabs are a list of WordGroup ids that are found within the sentence.<br>previousSentence - address of the Sentence before this one. This is useful to have precalculated for rewind behavior |
| word | text<br>wordGroupId (opt)<br>audioStart<br>duration | |
| note | head<br>body<br>duration | |
| music__or__silence | audioStart<br>duration | |
| gap | audioStart<br>duration | |
| start__chapter<br>finish__chapter | | |

What is claimed is:

1. A system for language learning, comprising:

a processor; and a non-transitory computer readable medium comprising instructions to:

obtain an audio file and a corresponding transcript and timing file, the transcript and timing file comprising words of a transcript of content of the audio file;

auditorily present the content of the audio file;

simultaneously with the auditory presentation of the content of the audio file, generate an interface using the transcript and timing file, the interface including a visual display, the visual display synchronized with the auditory presentation of the content and presenting a visual transcript of the content in a target language, wherein:

the visual transcript includes a visual transcript of a set of characters comprising the content, the visual transcript of the set of characters includes a redacted character, and the redacted character is redacted by presenting a corresponding lozenge for the redacted character in the visual display, wherein a visual appearance of the corresponding lozenge for the redacted character communicates a structure or expression of the redacted character, and synchronizing the visual display of the visual transcript of the content with the auditory presentation of the content comprises:

determining that the redacted character is being presented in the auditory presentation of the content;

highlighting the presentation of the corresponding lozenge of the redacted character in the visual display substantially simultaneously with the auditory presentation of that character in the auditory presentation.

2. The system of claim 1, wherein the structure or expression is a number of syllables of the character.

3. The system of claim 2, wherein the lozenge comprises at least one embedded dot corresponding to the number of syllables of the character.

4. The system of claim 1, wherein the structure or expression comprises a class of the redacted character.

5. The system of claim 4, wherein a color of the lozenge indicates the class of the redacted character.

6. The system of claim 5, wherein the class of the redacted character is a kanji, a hiragana, a katakana, or a romaji.

7. The system of claim 1, wherein the redacted character is an alphabetic character that comprises an alphabetic font, and wherein a vertical height of the lozenge corresponds to a distance between a baseline and a mean line of the alphabetic font.

8. A method for language learning, comprising:

obtaining an audio file and a corresponding transcript and timing file, the transcript and timing file comprising words of a transcript of content of the audio file;

auditorily present the content of the audio file;

simultaneously with the auditory presentation of the content of the audio file, generating an interface at an electronic device using the transcript and timing file, the interface including a visual display, the visual display synchronized with the auditory presentation of the content and presenting a visual transcript of the content in a target language, wherein:

the visual transcript includes a visual transcript of a set of characters comprising the content, the visual transcript of the set of characters includes a redacted character, and the redacted character is redacted by presenting a corresponding lozenge for the redacted character in the visual display, wherein a visual appearance of the corresponding lozenge for the redacted character communicates a structure or expression of the redacted character, and synchronizing the visual display of the visual transcript of the content with the auditory presentation of the content comprises:

determining that the redacted character is being presented in the auditory presentation of the content; and highlighting the presentation of the corresponding lozenge of the redacted character in the visual display substantially simultaneously with the auditory presentation of that character in the auditory presentation.

9. The method of claim 8, wherein the structure or expression is a number of syllables of the character.

10. The method of claim 9, wherein the lozenge comprises at least one embedded dot corresponding to the number of syllables of the character.

11. The method of claim 8, wherein the structure or expression comprises a class of the redacted character.

12. The method of claim 11, wherein a color of the lozenge indicates the class of the redacted character.

13. The method of claim 12, wherein the class of the redacted character is a kanji, a hiragana, a katakana, or a romaji.

14. The method of claim 8, wherein the redacted character is an alphabetic character that comprises an alphabetic font, and wherein a vertical height of the lozenge corresponds to a distance between a baseline and a mean line of the alphabetic font.

15. A non-transitory computer readable medium, comprising instructions for:

obtaining an audio file and a corresponding transcript and timing file, the transcript and timing file comprising words of a transcript of content of the audio file;

auditorily present the content of the audio file;

simultaneously with the auditory presentation of the content of the audio file, generating an interface at an electronic device using the transcript and timing file, the interface including a visual display, the visual display synchronized with the auditory presentation of the content and presenting a visual transcript of the content in a target language, wherein:

the visual transcript includes a visual transcript of a set of characters comprising the content, the visual transcript of the set of characters includes a redacted character, and the redacted character is redacted by presenting a corresponding lozenge for the redacted character in the visual display, wherein a visual appearance of the corresponding lozenge for the redacted character communicates a structure or expression of the redacted character, and synchronizing the visual display of the visual transcript of the content with the auditory presentation of the content comprises:

determining that the redacted character is being presented in the auditory presentation of the content; and highlighting the presentation of the corresponding lozenge of the redacted character in the visual display substantially simultaneously with the auditory presentation of that character in the auditory presentation.

16. The non-transitory computer readable medium of claim 15, wherein the structure or expression is a number of syllables of the character.

17. The non-transitory computer readable medium of claim 16, wherein the lozenge comprises at least one embedded dot corresponding to the number of syllables of the character.

18. The non-transitory computer readable medium of claim 15, wherein the structure or expression comprises a class of the redacted character.

19. The non-transitory computer readable medium of claim 18, wherein a color of the lozenge indicates the class of the redacted character.

20. The non-transitory computer readable medium of claim 19, wherein the class of the redacted character is a kanji, a hiragana, a katakana, or a romaji.

21. The non-transitory computer readable medium of claim 15, wherein the redacted character is an alphabetic character that comprises an alphabetic font, and wherein a vertical height of the lozenge corresponds to a distance between a baseline and a mean line of the alphabetic font.

* * * * *